US010185113B2

(12) United States Patent
Prest et al.

(10) Patent No.: US 10,185,113 B2
(45) Date of Patent: Jan. 22, 2019

(54) TECHNIQUES FOR STRENGTHENING GLASS COVERS FOR PORTABLE ELECTRONIC DEVICES

(71) Applicant: Apple Inc., Cupertino, CA (US)

(72) Inventors: Christopher Prest, San Francisco, CA (US); Stephen Paul Zadesky, Portola Valley, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 14/586,716

(22) Filed: Dec. 30, 2014

(65) Prior Publication Data
US 2015/0116919 A1 Apr. 30, 2015

Related U.S. Application Data

(63) Continuation of application No. 12/895,372, filed on Sep. 30, 2010, now Pat. No. 8,937,689, which is a (Continued)

(51) Int. Cl.
G02F 1/1335 (2006.01)
G02B 7/00 (2006.01)
(Continued)

(52) U.S. Cl.
CPC ............... G02B 7/007 (2013.01); C03C 19/00 (2013.01); C03C 21/002 (2013.01);
(Continued)

(58) Field of Classification Search
CPC ....... C03C 19/00; C03C 21/002; C03C 15/00; G06F 1/1613; G06F 1/1637;
(Continued)

(56) References Cited

U.S. PATENT DOCUMENTS 2,643,020 A 6/1953 Dalton
3,415,637 A 12/1968 Glynn
(Continued)

FOREIGN PATENT DOCUMENTS

AT 283 630 B 10/1970
CN 1277090 12/2000
(Continued)

OTHER PUBLICATIONS

International Search Report and Written Opinion for International Application No. PCT/US2010/050823, dated Jan. 5, 2011.
(Continued)

Primary Examiner — Hoan C Nguyen
(74) Attorney, Agent, or Firm — Brownstein Hyatt Farber Schreck, LLP

(57) ABSTRACT

Apparatus, systems and methods for improving strength of a thin glass cover for an electronic device are disclosed. In one embodiment, the glass member can have improved strength by forming its edges with a predetermined geometry and/or by chemically strengthening the edges. Advantageously, the glass member can be not only thin but also adequately strong to limit susceptibility to damage. In one embodiment, the glass member can pertain to a glass cover for a housing for an electronic device. The glass cover can be provided over or integrated with a display, such as a Liquid Crystal Display (LCD) display.

23 Claims, 14 Drawing Sheets

Related U.S. Application Data continuation-in-part of application No. PCT/US2010/025979, filed on Mar. 2, 2010.

(60) Provisional application No. 61/156,803, filed on Mar. 2, 2009.

(51) Int. Cl.
    *C03C 19/00*    (2006.01)
    *C03C 21/00*    (2006.01)
    *G06F 1/16*     (2006.01)

(52) U.S. Cl.
    CPC .......... *G06F 1/1613* (2013.01); *G06F 1/1637* (2013.01); *Y10T 428/24777* (2015.01)

(58) Field of Classification Search
    CPC ..... G06F 2001/133331; G06F 1/13338; G06F 3/041; G02B 7/007; Y10T 428/24777
    USPC .......................................................... 349/12
    See application file for complete search history.

(56) References Cited

U.S. PATENT DOCUMENTS

| | | |
|---|---|---|
| 3,441,398 A | 4/1969 | Hess |
| 3,467,508 A | 9/1969 | Loukes et al. |
| 3,498,773 A | 3/1970 | Due et al. |
| 3,558,415 A | 1/1971 | Rieser et al. |
| 3,607,172 A | 9/1971 | Poole et al. |
| 3,619,240 A | 11/1971 | Toussaint et al. |
| 3,626,723 A | 12/1971 | Plumat |
| 3,652,244 A | 3/1972 | Plumat |
| 3,753,840 A | 8/1973 | Plumat |
| 3,798,013 A | 3/1974 | Hasegawa et al. |
| 3,843,472 A | 10/1974 | Toussaint et al. |
| 3,857,689 A | 12/1974 | Koizumi et al. |
| 3,926,605 A | 12/1975 | Kunkle |
| 3,951,707 A | 4/1976 | Kurtz et al. |
| 4,015,045 A | 3/1977 | Rinehart |
| 4,052,184 A | 10/1977 | Anderson |
| 4,119,760 A | 10/1978 | Rinehart |
| 4,156,755 A | 5/1979 | Rinehart |
| 4,165,228 A | 8/1979 | Ebata et al. |
| 4,178,082 A | 12/1979 | Ganswein et al. |
| 4,212,919 A | 7/1980 | Hoda |
| 4,218,230 A | 8/1980 | Hogan |
| 4,346,601 A | 8/1982 | France |
| 4,353,649 A | 10/1982 | Kishii |
| 4,425,810 A | 1/1984 | Simon et al. |
| 4,537,820 A | 8/1985 | Nowobliski et al. |
| 4,646,722 A | 3/1987 | Silverstein et al. |
| 4,733,973 A | 3/1988 | Machak et al. |
| 4,842,629 A | 6/1989 | Clemens et al. |
| 4,844,724 A | 7/1989 | Sakai et al. |
| 4,846,868 A | 7/1989 | Aratani |
| 4,849,002 A | 7/1989 | Rapp |
| 4,872,896 A | 10/1989 | LaCourse et al. |
| 4,911,743 A | 3/1990 | Bagby |
| 4,937,129 A | 6/1990 | Yamazaki |
| 4,957,364 A | 9/1990 | Chesler |
| 4,959,548 A | 9/1990 | Kupperman et al. |
| 4,983,197 A | 1/1991 | Froning et al. |
| 4,986,130 A | 1/1991 | Engelhaupt et al. |
| 5,041,173 A | 8/1991 | Shikata et al. |
| 5,104,435 A | 4/1992 | Oikawa et al. |
| 5,129,934 A | 7/1992 | Koss |
| 5,157,746 A | 10/1992 | Tobita et al. |
| 5,160,523 A | 11/1992 | Honkanen et al. |
| 5,254,149 A | 10/1993 | Hashemi et al. |
| 5,269,888 A | 12/1993 | Morasca |
| 5,281,303 A | 1/1994 | Beguin et al. |
| 5,369,267 A | 11/1994 | Johnson et al. |
| 5,399,435 A * | 3/1995 | Ando ................ B32B 17/10174 428/428 |
| 5,411,563 A | 5/1995 | Yeh |
| 5,437,193 A | 8/1995 | Schleitweiler et al. |
| 5,445,871 A | 8/1995 | Murase et al. |
| 5,483,261 A | 1/1996 | Yasutake |
| 5,488,204 A | 1/1996 | Mead et al. |
| 5,525,138 A | 6/1996 | Hashemi et al. |
| 5,625,154 A | 4/1997 | Matsuhiro et al. |
| 5,654,057 A | 8/1997 | Kitayama |
| 5,725,625 A | 3/1998 | Kitayama et al. |
| 5,733,622 A | 3/1998 | Starcke et al. |
| 5,766,493 A | 6/1998 | Shin |
| 5,780,371 A | 7/1998 | Rifqi et al. |
| 5,816,225 A | 10/1998 | Koch et al. |
| 5,825,352 A | 10/1998 | Bisset et al. |
| 5,826,601 A | 10/1998 | Muraoka et al. |
| 5,835,079 A | 11/1998 | Shieh |
| 5,880,411 A | 3/1999 | Gillespie et al. |
| 5,930,047 A | 7/1999 | Gunz et al. |
| 5,953,094 A | 9/1999 | Matsuoka et al. |
| 5,985,014 A | 11/1999 | Ueda et al. |
| 6,050,870 A | 4/2000 | Suginoya et al. |
| 6,114,039 A | 9/2000 | Rifqui |
| 6,120,908 A | 9/2000 | Papanu et al. |
| 6,166,915 A | 12/2000 | Lake et al. |
| 6,188,391 B1 | 2/2001 | Seely et al. |
| 6,245,313 B1 | 6/2001 | Suzuki et al. |
| 6,287,674 B1 | 9/2001 | Verlinden et al. |
| 6,307,590 B1 | 10/2001 | Yoshida |
| 6,310,610 B1 | 10/2001 | Beaton et al. |
| 6,323,846 B1 | 11/2001 | Westerman et al. |
| 6,325,704 B1 | 12/2001 | Brown et al. |
| 6,327,011 B2 | 12/2001 | Kim |
| 6,350,664 B1 | 2/2002 | Haji et al. |
| 6,393,180 B1 | 5/2002 | Farries et al. |
| 6,429,840 B1 | 8/2002 | Sekiguchi |
| 6,437,867 B2 | 8/2002 | Zeylikovich et al. |
| 6,516,634 B1 | 2/2003 | Green et al. |
| 6,521,862 B1 | 2/2003 | Brannon |
| 6,551,673 B1 | 4/2003 | Yamamoto et al. |
| 6,621,542 B1 | 9/2003 | Aruga |
| 6,690,387 B2 | 2/2004 | Zimmerman et al. |
| 6,710,797 B1 * | 3/2004 | McNelley .......... G02B 27/2292 348/14.08 |
| 6,718,612 B2 | 4/2004 | Bajorek |
| 6,769,274 B2 | 8/2004 | Cho et al. |
| 6,772,610 B1 | 8/2004 | Albrand et al. |
| 6,810,688 B1 | 11/2004 | Duisit et al. |
| 6,936,741 B2 | 8/2005 | Munnig et al. |
| 6,955,971 B2 | 10/2005 | Ghyselen et al. |
| 6,996,324 B2 | 2/2006 | Hiraka et al. |
| 7,012,700 B2 | 3/2006 | De Groot et al. |
| 7,013,709 B2 | 3/2006 | Hajduk et al. |
| 7,015,894 B2 | 3/2006 | Morohoshi |
| 7,070,837 B2 | 7/2006 | Ross |
| 7,166,531 B1 | 1/2007 | van Den Hoek et al. |
| 7,184,064 B2 | 2/2007 | Zimmerman et al. |
| 7,461,564 B2 | 12/2008 | Glaesemann |
| 7,558,054 B1 | 7/2009 | Prest et al. |
| 7,626,807 B2 | 12/2009 | Hsu |
| 7,663,607 B2 | 2/2010 | Hotelling et al. |
| 7,810,355 B2 | 10/2010 | Feinstein et al. |
| 7,872,644 B2 | 1/2011 | Hong et al. |
| 7,918,019 B2 | 4/2011 | Chang et al. |
| 8,013,834 B2 | 9/2011 | Kim |
| 8,110,268 B2 | 2/2012 | Hegemier et al. |
| 8,111,248 B2 | 2/2012 | Lee et al. |
| 8,312,743 B2 | 11/2012 | Pun et al. |
| 8,391,010 B2 | 3/2013 | Rothkopf |
| 8,393,175 B2 | 3/2013 | Kohli et al. |
| 8,551,283 B2 | 10/2013 | Pakula et al. |
| 8,673,163 B2 | 3/2014 | Zhong |
| 8,684,613 B2 | 4/2014 | Weber et al. |
| 8,824,140 B2 | 9/2014 | Prest |
| 9,128,666 B2 | 9/2015 | Werner |
| 2002/0035853 A1 | 3/2002 | Brown et al. |
| 2002/0105793 A1 | 8/2002 | Oda |
| 2002/0155302 A1 | 10/2002 | Smith et al. |
| 2002/0157199 A1 | 10/2002 | Piltingsrud |
| 2003/0024274 A1 | 2/2003 | Cho et al. |
| 2003/0057183 A1 | 3/2003 | Cho et al. |

(56) References Cited

U.S. PATENT DOCUMENTS

| | | |
|---|---|---|
| 2003/0077453 A1 | 4/2003 | Oaku et al. |
| 2003/0234771 A1 | 12/2003 | Mulligan et al. |
| 2004/0051944 A1 | 3/2004 | Stark |
| 2004/0119701 A1 | 6/2004 | Mulligan et al. |
| 2004/0137828 A1 | 7/2004 | Takashashi et al. |
| 2004/0142118 A1 | 7/2004 | Takechi |
| 2004/0163414 A1 | 8/2004 | Eto et al. |
| 2005/0020193 A1 | 1/2005 | Allaire |
| 2005/0058423 A1 | 3/2005 | Brinkmann et al. |
| 2005/0105071 A1 | 5/2005 | Ishii |
| 2005/0135724 A1 | 6/2005 | Helvajian et al. |
| 2005/0174525 A1 | 8/2005 | Tsuboi |
| 2005/0193772 A1 | 9/2005 | Davidson et al. |
| 2005/0221044 A1 | 10/2005 | Gaume |
| 2005/0245165 A1 | 11/2005 | Harada et al. |
| 2005/0259438 A1 | 11/2005 | Mizutani |
| 2005/0285991 A1 | 12/2005 | Yamazaki |
| 2006/0026521 A1 | 2/2006 | Hotelling et al. |
| 2006/0055936 A1 | 3/2006 | Yun et al. |
| 2006/0063351 A1 | 3/2006 | Jain |
| 2006/0070694 A1 | 4/2006 | Rehfeld et al. |
| 2006/0097991 A1 | 5/2006 | Hotelling et al. |
| 2006/0197753 A1 | 9/2006 | Hotelling et al. |
| 2006/0227331 A1 | 10/2006 | Wollmer et al. |
| 2006/0238695 A1 | 10/2006 | Miyamoto |
| 2006/0250559 A1 | 11/2006 | Bocko et al. |
| 2006/0268528 A1 | 11/2006 | Zadeksky et al. |
| 2006/0292822 A1 | 12/2006 | Xie |
| 2007/0003796 A1 | 1/2007 | Isono et al. |
| 2007/0013822 A1 | 1/2007 | Kawata et al. |
| 2007/0029519 A1 | 2/2007 | Kikuyama et al. |
| 2007/0030436 A1 | 2/2007 | Sasabayashi |
| 2007/0039353 A1 | 2/2007 | Kamiya |
| 2007/0046200 A1 | 3/2007 | Fu et al. |
| 2007/0063876 A1 | 3/2007 | Wong |
| 2007/0089827 A1 | 4/2007 | Funatsu |
| 2007/0122542 A1 | 5/2007 | Halsey et al. |
| 2007/0132737 A1 | 6/2007 | Mulligan et al. |
| 2007/0196578 A1 | 8/2007 | Karp et al. |
| 2007/0236618 A1 | 10/2007 | Magg et al. |
| 2008/0020919 A1 | 1/2008 | Murata |
| 2008/0026260 A1 | 1/2008 | Kawai |
| 2008/0074028 A1 | 3/2008 | Ozolins et al. |
| 2008/0094716 A1 | 4/2008 | Ushiro et al. |
| 2008/0135175 A1 | 6/2008 | Higuchi |
| 2008/0158181 A1 | 7/2008 | Hamblin et al. |
| 2008/0202167 A1 | 8/2008 | Cavallaro et al. |
| 2008/0230177 A1 | 9/2008 | Crouser et al. |
| 2008/0243321 A1 | 10/2008 | Walser et al. |
| 2008/0261057 A1 | 10/2008 | Slobodin |
| 2008/0264176 A1 | 10/2008 | Bertrand et al. |
| 2008/0286548 A1 | 11/2008 | Ellison et al. |
| 2009/0046240 A1 | 2/2009 | Bolton |
| 2009/0067141 A1 | 3/2009 | Dabov et al. |
| 2009/0091551 A1 | 4/2009 | Hotelling et al. |
| 2009/0096937 A1 | 4/2009 | Bauer et al. |
| 2009/0153729 A1 | 6/2009 | Hiltunen et al. |
| 2009/0162703 A1 | 6/2009 | Kawai |
| 2009/0197048 A1 | 8/2009 | Amin et al. |
| 2009/0197088 A1 | 8/2009 | Murata et al. |
| 2009/0202808 A1 | 8/2009 | Glaesemann et al. |
| 2009/0220761 A1 | 9/2009 | Dejneka et al. |
| 2009/0257189 A1 | 10/2009 | Wang et al. |
| 2009/0294420 A1 | 12/2009 | Abramov et al. |
| 2009/0324899 A1 | 12/2009 | Feinstein et al. |
| 2009/0324939 A1 | 12/2009 | Feinstein et al. |
| 2010/0009154 A1 | 1/2010 | Allan et al. |
| 2010/0024484 A1 | 2/2010 | Kashima |
| 2010/0028607 A1 | 2/2010 | Lee et al. |
| 2010/0035038 A1 | 2/2010 | Barefoot et al. |
| 2010/0053632 A1 | 3/2010 | Alphonse et al. |
| 2010/0062284 A1 | 3/2010 | Watanabe et al. |
| 2010/0119846 A1 | 5/2010 | Sawada |
| 2010/0137031 A1 | 6/2010 | Griffin et al. |
| 2010/0154992 A1 | 6/2010 | Feinstein et al. |
| 2010/0167059 A1 | 7/2010 | Hasimoto et al. |
| 2010/0171920 A1 | 7/2010 | Nishiyama |
| 2010/0179044 A1 | 7/2010 | Sellier et al. |
| 2010/0199227 A1* | 8/2010 | Xiao .................... G06F 3/0481 715/863 |
| 2010/0206008 A1 | 8/2010 | Harvey et al. |
| 2010/0210442 A1* | 8/2010 | Abramov ............... C03B 33/091 501/66 |
| 2010/0215862 A1 | 8/2010 | Gomez et al. |
| 2010/0216514 A1 | 8/2010 | Smoyer et al. |
| 2010/0224767 A1 | 9/2010 | Kawano et al. |
| 2010/0265188 A1 | 10/2010 | Chang et al. |
| 2010/0279067 A1 | 11/2010 | Sabia et al. |
| 2010/0279068 A1* | 11/2010 | Cook .................... C03B 23/26 428/141 |
| 2010/0285272 A1* | 11/2010 | Koval .................... C03C 3/083 428/141 |
| 2010/0285275 A1 | 11/2010 | Baca et al. |
| 2010/0296027 A1 | 11/2010 | Matsuhira et al. |
| 2010/0315570 A1 | 12/2010 | Mathew et al. |
| 2010/0321305 A1 | 12/2010 | Chang et al. |
| 2011/0003619 A1 | 1/2011 | Fujii |
| 2011/0012873 A1 | 1/2011 | Prest et al. |
| 2011/0019123 A1 | 1/2011 | Prest et al. |
| 2011/0019354 A1 | 1/2011 | Prest et al. |
| 2011/0030209 A1 | 2/2011 | Chang et al. |
| 2011/0050657 A1 | 3/2011 | Yamada |
| 2011/0063550 A1 | 3/2011 | Gettemy et al. |
| 2011/0067447 A1 | 3/2011 | Prest et al. |
| 2011/0072856 A1 | 3/2011 | Davidson et al. |
| 2011/0102346 A1 | 5/2011 | Orsley et al. |
| 2011/0159321 A1 | 6/2011 | Eda et al. |
| 2011/0164372 A1 | 7/2011 | McClure et al. |
| 2011/0182084 A1 | 7/2011 | Tomlinson |
| 2011/0186345 A1 | 8/2011 | Pakula et al. |
| 2011/0188846 A1 | 8/2011 | Sorg |
| 2011/0199687 A1 | 8/2011 | Sellier et al. |
| 2011/0205399 A1* | 8/2011 | Gao .................... G06F 17/30056 348/231.99 |
| 2011/0248152 A1 | 10/2011 | Svajda et al. |
| 2011/0255000 A1 | 10/2011 | Weber et al. |
| 2011/0255250 A1 | 10/2011 | Dinh |
| 2011/0267833 A1 | 11/2011 | Verrat-Debailleul et al. |
| 2011/0279383 A1 | 11/2011 | Wilson et al. |
| 2011/0300908 A1 | 12/2011 | Grespan et al. |
| 2012/0018323 A1 | 1/2012 | Johnson et al. |
| 2012/0027399 A1 | 2/2012 | Yeates |
| 2012/0052302 A1* | 3/2012 | Matusick ............... C03C 15/00 428/410 |
| 2012/0099113 A1 | 4/2012 | de Boer et al. |
| 2012/0105400 A1 | 5/2012 | Mathew et al. |
| 2012/0118628 A1 | 5/2012 | Pakula et al. |
| 2012/0135195 A1 | 5/2012 | Glaesemann et al. |
| 2012/0136259 A1 | 5/2012 | Milner et al. |
| 2012/0151760 A1 | 6/2012 | Steijner |
| 2012/0188743 A1 | 7/2012 | Wilson et al. |
| 2012/0196071 A1 | 8/2012 | Cornejo et al. |
| 2012/0202040 A1 | 8/2012 | Barefoot et al. |
| 2012/0236477 A1 | 9/2012 | Weber et al. |
| 2012/0236526 A1 | 9/2012 | Weber et al. |
| 2012/0281381 A1 | 11/2012 | Sanford |
| 2012/0328843 A1 | 12/2012 | Cleary et al. |
| 2013/0071601 A1 | 3/2013 | Bibl et al. |
| 2013/0083506 A1 | 4/2013 | Wright et al. |
| 2013/0182259 A1 | 7/2013 | Brezinski et al. |
| 2013/0213565 A1 | 8/2013 | Lee et al. |
| 2014/0176779 A1 | 6/2014 | Weber et al. |
| 2014/0202985 A1 | 7/2014 | Fujii |

FOREIGN PATENT DOCUMENTS

| | | |
|---|---|---|
| CN | 1369449 A | 9/2002 |
| CN | 1694589 A | 11/2005 |
| CN | 101025502 | 8/2007 |
| CN | 101206314 | 6/2008 |
| CN | 101225698 * | 7/2008 |
| CN | 101523275 | 2/2009 |
| CN | 101465892 | 6/2009 |

(56) References Cited

FOREIGN PATENT DOCUMENTS

| | | |
|---|---|---|
| CN | 102117104 | 7/2011 |
| CN | 102131357 | 7/2011 |
| CN | 101267509 | 8/2011 |
| CN | 1322339 A | 11/2011 |
| CN | 202799425 | 3/2013 |
| CN | 103958423 | 7/2014 |
| DE | 1496586 | 6/1969 |
| DE | 17 71 268 A1 | 12/1971 |
| DE | 32 12 612 A1 | 10/1983 |
| DE | 103 22 350 A1 | 12/2004 |
| EP | 1038663 | 9/2000 |
| EP | 1206422 | 11/2002 |
| EP | 1592073 | 11/2005 |
| EP | 1593658 | 11/2005 |
| EP | 2025556 A2 | 2/2009 |
| EP | 2036867 A1 | 3/2009 |
| EP | 2075237 | 7/2009 |
| EP | 2196870 A1 | 6/2010 |
| EP | 2233447 | 9/2010 |
| EP | 2483216 | 8/2012 |
| EP | 2635540 | 9/2013 |
| FR | 2797627 | 2/2001 |
| FR | 2801302 | 5/2001 |
| GB | 1048580 | 6/1963 |
| GB | 1 346 747 | 2/1974 |
| JP | S48-006925 | 3/1973 |
| JP | 55031944 | 3/1980 |
| JP | 55067529 | 5/1980 |
| JP | 55-95645 | 7/1980 |
| JP | S55136979 | 10/1980 |
| JP | 55 144450 | 11/1980 |
| JP | S59013638 | 1/1984 |
| JP | 59037451 | 2/1984 |
| JP | 6066696 | 4/1985 |
| JP | S61097147 | 5/1986 |
| JP | 63 060129 | 3/1988 |
| JP | S63106617 | 5/1988 |
| JP | 63222234 | 9/1988 |
| JP | 5-32431 | 2/1993 |
| JP | 05249422 | 9/1993 |
| JP | 6242260 A | 9/1994 |
| JP | H07050144 | 2/1995 |
| JP | H08274054 | 10/1996 |
| JP | 52031757 | 3/1997 |
| JP | H09073072 | 3/1997 |
| JP | H09507206 | 7/1997 |
| JP | 09-312245 | 12/1997 |
| JP | H11281501 | 10/1999 |
| JP | 2000086261 | 3/2000 |
| JP | 2000-163031 | 6/2000 |
| JP | 2002003895 | 7/2000 |
| JP | 2001083887 | 3/2001 |
| JP | 2002003895 | 1/2002 |
| JP | 2002160932 | 6/2002 |
| JP | 2002-342033 | 11/2002 |
| JP | 2002338283 | 11/2002 |
| JP | 2003502257 | 1/2003 |
| JP | 2003146705 | 5/2003 |
| JP | 2004094256 | 3/2004 |
| JP | 2004259402 | 9/2004 |
| JP | 2004292247 | 10/2004 |
| JP | A2004339019 | 12/2004 |
| JP | 2005-162549 | 6/2005 |
| JP | 2005140901 | 6/2005 |
| JP | 2005156766 | 6/2005 |
| JP | 2005353592 | 12/2005 |
| JP | A2000348338 | 12/2005 |
| JP | 2007099557 | 4/2007 |
| JP | 2008-001590 | 1/2008 |
| JP | 2008007360 | 1/2008 |
| JP | 2008-066126 A | 3/2008 |
| JP | 2008063166 | 3/2008 |
| JP | 2008192194 | 8/2008 |
| JP | 2008195602 | 8/2008 |
| JP | A2008-216938 | 9/2008 |
| JP | A2008-306149 | 12/2008 |
| JP | 2009167086 | 7/2009 |
| JP | 2009230341 | 10/2009 |
| JP | 2009234856 | 10/2009 |
| JP | 2010 064943 | 3/2010 |
| JP | 2010060908 | 3/2010 |
| JP | 2010116276 | 5/2010 |
| JP | 3162733 U | 8/2010 |
| JP | 2010/195600 | 9/2010 |
| JP | 2010237493 | 10/2010 |
| JP | 2011-032124 | 2/2011 |
| JP | 2011032140 | 2/2011 |
| JP | 2011158799 | 8/2011 |
| JP | 2011-527661 | 11/2011 |
| JP | A 2011-231009 | 11/2011 |
| JP | 2013537723 | 10/2013 |
| KR | 102006005920 | 1/2006 |
| KR | 1020100019526 | 2/2010 |
| KR | 10-2011-0030919 | 3/2011 |
| TW | 201007521 | 2/2010 |
| TW | 201235744 | 9/2012 |
| WO | WO 00/47529 A | 8/2000 |
| WO | WO 02/42838 A1 | 5/2002 |
| WO | WO2004/014109 | 2/2004 |
| WO | WO2004/061806 | 7/2004 |
| WO | WO 2004/106253 A | 12/2004 |
| WO | WO2007/089054 | 8/2007 |
| WO | WO 2008/044694 A | 4/2008 |
| WO | WO 2008/143999 A1 | 11/2008 |
| WO | WO 2009/003029 | 12/2008 |
| WO | WO 2009010315 * | 1/2009 |
| WO | WO2009/078406 | 6/2009 |
| WO | WO 2009/099615 | 8/2009 |
| WO | WO2009/102326 | 8/2009 |
| WO | WO 2009125133 A2 | 10/2009 |
| WO | WO 2010/005578 | 1/2010 |
| WO | WO 2010/014163 | 2/2010 |
| WO | WO 2010/019829 A1 | 2/2010 |
| WO | WO2010/027565 | 3/2010 |
| WO | WO 2010/080988 | 7/2010 |
| WO | WO2010/101961 | 9/2010 |
| WO | WO2011/008433 | 1/2011 |
| WO | WO 2011/041484 A1 | 4/2011 |
| WO | WO 2012/015960 | 2/2012 |
| WO | WO2012/027220 | 3/2012 |
| WO | WO 2012/106280 | 8/2012 |
| WO | WO 2013/106242 A2 | 7/2013 |

OTHER PUBLICATIONS

Chemically Strengthened Glass, Wikipedia, Apr. 19, 2009, http://en/wikipedia.org/w/index.php?title=Chemically_strengthened_glass&oldid=284794988.

Wikipedia: "Iphone 4", www.wikipedia.org, retrieved Oct. 31, 2011, 15 pgs.

"Toward Making Smart Phone Touch-Screens More Glare and Smudge Resistant", e! Science News, http://eciencenews.com/articles/2009/08/19toward.making smart.phone.touch.screens.more.glare.and.smudge.resistant, Aug. 19, 2009, 1 pg.

Arun K. Varshneya, Chemical Strengthening of Glass: Lessons Learned and Yet to be Learned International Journal of Applied Glass Science, 2010, 1, 2, pp. 131-142.

Office Action for Japanese Patent Application No. 2011-553057, dated May 20, 2013.

Aben "Laboratory of Photoelasticity", Institute of Cybernetics at TTU, www.ioc.ee/res/photo.html, Oct. 5, 2000.

Forooghian et al., Investigative Ophthalmology & Visual Science; Oct. 2008, vol. 49, No. 10.

Examination Report for EP Application No. 10709119.1, dated Feb. 8, 2013.

Office Action for U.S. Appl. No. 12/895,393, dated May 22, 2013.

"iPhone 4", Wikipedia, Jan. 4, 2012, 17 pgs.

Mehrl et al., "Designer's Noticebook: Proximity Detection IR LED and Optical Crosstalk", http://ams.com/eng/content/view/download/145137, Aug. 1, 2011, 5 pages.

(56) References Cited

OTHER PUBLICATIONS

Office Action for Chinese Patent Application No. 201080016127.2, dated Sep. 17, 2013.
Office Action for U.S. Appl. No. 12/895,393, dated Oct. 18, 2013.
Office Action for Japanese Patent Application No. 2012-532298, dated Nov. 1, 2013.
Office Action for Great Britain Patent Application No. GB1016457.2, dated Dec. 4, 2013.
Notice of Preliminary Rejection for Korean Patent Application No. 10-2012-7011023, dated Dec. 26, 2013.
Saxer et al., "High-Speed Fiber-Based Polarization-sensitive optical coherence tomography of in vivo human skin", Optics Letters, vol. 25, No. 18, Sep. 15, 2000, pp. 1355-1357.
Examination Report for UK Patent Application No. 1016457.2, dated Feb. 28, 2014.
Ohkuma, "Development of a Manufacturing Process of a Thin, Lightweight LCD Cell", Department of Cell Process Development, IBM, Japan, Section 13.4, 2000.
Lee et al., "A Multi-Touch Three Dimensional Touch-Sensitive Tablet", Proceedings of CHI: ACM Conference on Human Factors in Computing Systems, Apr. 1985, pp. 21-25.
Rubine, "The Automatic Recognition of Gestures", CMU-CS-91-202, Submitted in Partial Fulfillment of the Requirements of the Degree of Doctor of Philosophy in Computer Science at Carnegie Mellon University, Dec. 1991, 285 pages.
Rubine, "Combining Gestures and Direct Manipulation", CHI'92, May 1992, pp. 659-660.
Westerman, "Hand Tracking, Finger Identification and Chronic Manipulation of a Multi-Touch Surface", A Dissertation Submitted to the Faculty of the University of Delaware in Partial Fulfillment of the Requirements for the degree of Doctor of Philosophy in Electrical Engineering, Spring 1999, 364 pages.
First Office Action for Chinese Patent Application No. 201080051738.0, dated Feb. 24, 2014.
Final Rejection for Japanese Patent Application No. 2011-553057, dated Feb. 10, 2014.
Office Action for U.S. Appl. No. 12/895,372, dated Apr. 4, 2014.
Karlsson et al., "The Technology of Chemical Glass Strengthening—a review", Apr. 2010, Glass Technology, European Journal of Glass Science and Technology A., vol. 51, No. 2, pp. 41-54.
Second Office Action for Chinese Patent Application No. 20108006127.2, dated Jun. 6, 2014.
Second Office Action for Chinese Patent Application No. 201080051738.0, dated Sep. 17, 2014.
Kingery et al., "Introduction to Ceramics," 2nd Edition, John Wiley & Sons, pp. 792, 833-844, 1976.

* cited by examiner

TECHNIQUES FOR STRENGTHENING GLASS COVERS FOR PORTABLE ELECTRONIC DEVICES

CROSS-REFERENCE TO OTHER APPLICATIONS

This application is a continuation of U.S. application Ser. No. 12/895,372, filed Sep. 30, 2010 and entitled "Techniques for Strengthening Glass Covers for Portable Electronic Devices," which is hereby incorporated herein by reference, which in turn is a continuation-in-part application of International Application No, PCT/US2010/025979, filed Mar. 2, 2010 and entitled "Techniques for Strengthening Glass Covers for Portable Electronic Devices", which hereby incorporated herein by reference in its entirety, which in turn claims priority to U.S. Provisional Patent Application No. 61/156,803, filed Mar. 2, 2009 and entitled "Techniques for Strengthening Glass Covers for Portable Electronic Devices", which hereby incorporated herein by reference in its entirety.

BACKGROUND OF THE INVENTION

Conventionally, small form factor devices, such as handheld electronic devices, have a display arrangement that includes various layers. The various layers usually include at least a display technology layer, and may additionally include a sensing arrangement and/or a cover window disposed over the display technology layer. By way of example, the display technology layer may include or pertain to a Liquid Crystal Display (LCD) that includes a Liquid Crystal Module (LCM). The LCM generally includes an upper glass sheet and a lower glass sheet that sandwich a liquid crystal layer therebetween. The sensing arrangement may be a touch sensing arrangement such as those used to create a touch screen. For example, a capacitive sensing touch screen can include substantially transparent sensing points or nodes dispersed about a sheet of glass (or plastic). In addition, the cover window, which is typically designed as the outer protective barrier of the layer stack.

The cover window, or glass cover, for a small form factor device can be made of plastic or glass. Plastic is durable but susceptible to being scratched. Glass is scratch resistant, but brittle. In general, the thicker the glass, the stronger it is. Unfortunately, however, the glass cover is often relatively thin, and may be a relatively weak component of the device structure especially at its edges. For example, the glass cover may be susceptible to damage when the portable electronic device is stressed in an abusive manner. Chemically strengthening has been used to strengthen glass. While this has generally worked well, there is a continuing need to provide ways to strengthen the glass covers.

SUMMARY

The invention relates generally to increasing the strength of glass. The glass having increased strength can be thin yet be sufficiently strong to be suitable for use in electronic devices, such as portable electronic devices.

Embodiments of the invention can relate to apparatus, systems and methods for improving strength of a thin glass member for an electronic device. In one embodiment, the glass member has improved strength by forming its edges with a predetermined geometry. In another embodiment, the glass member can be strengthened at its edges by not only forming its edges with a predetermined geometry but also by a chemical strengthening process. The use of predetermined geometry for the edges of the glass member can also enhance the effectiveness of the chemical strengthening process. The glass member can be not only thin but also adequately strong to limit susceptibility to damage.

In one example, the glass member may be an outer surface of an electronic device. The glass member may for example correspond to a glass cover that helps form part of a display area of an electronic device (i.e., situated in front of a display either as a separate part or integrated within the display. Alternatively or additionally, the glass member may form a part of the housing. For example, it may form an outer surface other than in the display area.

The apparatus, systems and methods for improving strength of thin glass are especially suitable for glass covers, or displays (e.g., LCD displays), assembled in small form factor electronic devices such as handheld electronic devices (e.g., mobile phones, media players, personal digital assistants, remote controls, etc.). The glass can be thin in these small form factor embodiments, such as less than 3 mm, or more particularly between 0.5 and 2.5 mm. The apparatus, systems and methods can also be used for glass covers or displays for other devices including, but not limited to including, relatively larger form factor electronic devices (e.g., portable computers, tablet computers, displays, monitors, televisions, etc.). The glass can also be thin in these larger form factor embodiments, such as less than 5 mm, or more particularly between 0.5 and 3 mm.

The invention can be implemented in numerous ways, including as a method, system, device, or apparatus. Several embodiments of the invention are discussed below.

As a consumer electronic product, one embodiment can, for example, include at least: a housing having a front surface, a back surface and side surfaces; electrical components provided at least partially internal to the housing, the electrical components including at least a controller, a memory, and a display, the display being provided at or adjacent the front surface of the housing; and a cover glass provided at or over the front surface of the housing such that it is provided over the display. The cover glass can be strengthened by having edges of the glass cover correspond to a predetermined edge geometry and by chemically treating the edges of the glass cover.

As a cover glass member suitable for attachment to a housing for a handheld electronic device, the cover glass member can be produced and strengthened by a process that, for example, can includes at least: forming a plurality of cover glass members, each of the cover glass members being suitably sized to be provided on an exposed surface of the handheld electronic device, each of the cover glass members including edges and at least one non-edge portion; and obtaining a glass sheet, and singulating the glass sheet into a plurality of cover glass members, with each of the cover glass members being suitably sized to be provided on an exposed surface of the handheld electronic device. The process can also include manipulating the edges of each of the cover glass members to correspond to a predetermined edge geometry selected to strengthen the glass covers. Further, the process can include chemically strengthening at least the edges of each of the cover glass members by chemically altering a composition of at least the edges such that the composition of at least the edges differs from a composition of the at least one non-edge portion. In one embodiment, the cover glass members are chemically strengthened by placing them in a chemical solution which can operates to strengthen all surfaces of the cover glass members, including by not limited to the edges.

As a method for producing a glass cover for an exposed surface of a consumer electronic product, one embodiment can, for example, include at least the acts of: obtaining a glass sheet; singulating the glass sheet into a plurality of glass covers, each of the glass covers being suitably sized to be provided on the exposed surface of a consumer electronic product; and manipulating the edges of each of the glass covers to correspond to a predetermined edge geometry. The predetermined edge geometry is selected to strengthen the glass covers. In one embodiment, the method can further include placing the glass covers in an ion solution for a period of time to allow ions in the ion solution to effectively diffuse into the glass covers, thereby chemically strengthening the glass covers.

As a portable electronic device, one embodiment can, for example, include at least: a housing having a front surface, a back surface and side surfaces; electrical components provided at least partially internal to the housing, the electrical components including at least a controller, a memory, and a display, the display being provided at or adjacent the front surface of the housing; and a cover glass provided at or over the front surface of the housing such that it is provided over the display. The cover glass can be strengthened by having edges of the glass cover correspond to a predetermined edge geometry, and in some cases by chemically treating the edges of the glass cover. Also, following the chemical treatment of the edges of the glass cover, the cover glass can have a strength that is substantially uniform across the surface of the cover glass, including the edges.

Other aspects and advantages of the invention will become apparent from the following detailed description taken in conjunction with the accompanying drawings which illustrate, by way of example, the principles of the invention.

BRIEF DESCRIPTION OF THE DRAWINGS

The invention will be readily understood by the following detailed description in conjunction with the accompanying drawings, wherein like reference numerals designate like structural elements, and in which.

DETAILED DESCRIPTION OF EMBODIMENTS OF THE INVENTION

Figure 1A:
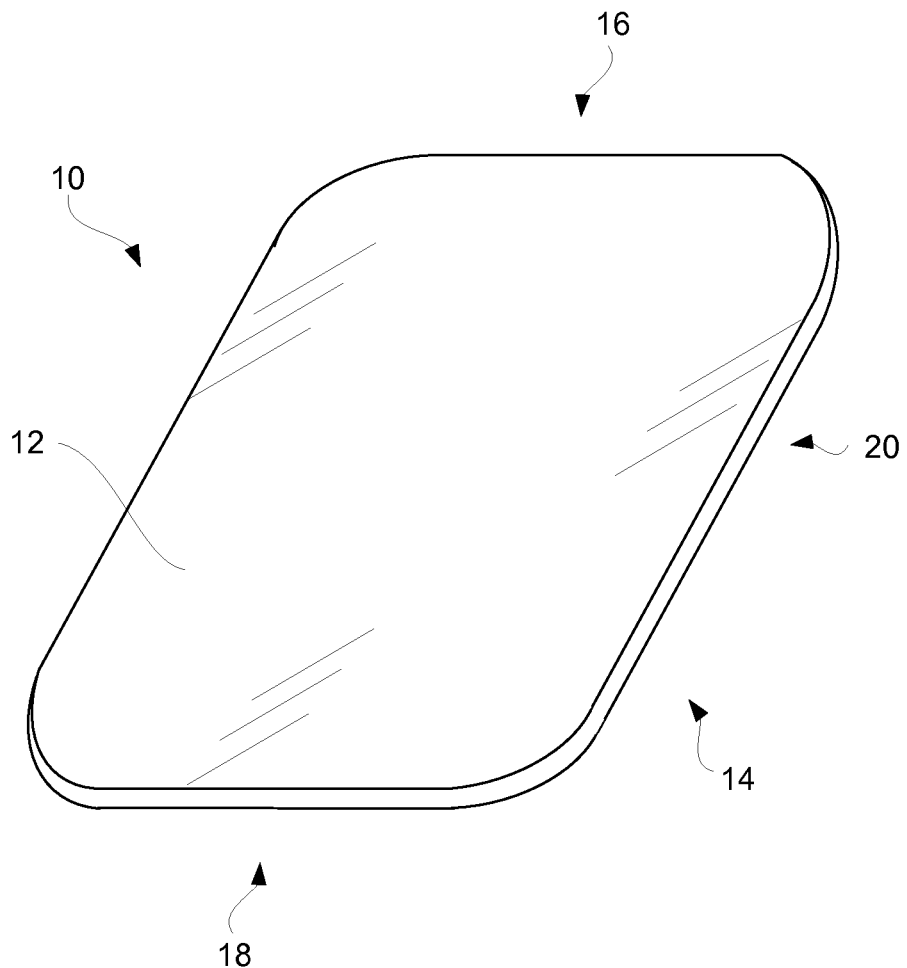
FIG. 1A is a perspective diagram of a glass member in accordance with one embodiment.

The invention relates generally to increasing the strength of glass. The glass having increased strength can be thin yet be sufficiently strong to be suitable for use in electronic devices, such as portable electronic devices.

The following detailed description is illustrative only, and is not intended to be in any way limiting. Other embodiments will readily suggest themselves to skilled persons having the benefit of this disclosure. Reference will now be made in detail to implementations as illustrated in the accompanying drawings. The same reference indicators will generally be used throughout the drawings and the following detailed description to refer to the same or like parts. It should be appreciated that the drawings are generally not drawn to scale, and at least some features of the drawings have been exaggerated for ease of illustration.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application and business related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

Embodiments of the invention can relate to apparatus, systems and methods for improving strength of a thin glass member for an electronic device. In one embodiment, the glass member has improved strength by forming its edges with a predetermined geometry. In another embodiment, the glass member can be strengthened at its edges by not only forming its edges with a predetermined geometry but also by a chemical strengthening process. The use of predetermined geometry for the edges of the glass member can also enhance the effectiveness of the chemical strengthening process. Advantageously, the glass member can be not only thin but also adequately strong to limit susceptibility to damage.

In one example, the glass member may be an outer surface of an electronic device. The glass member may for example correspond to a glass cover that helps form part of a display area of an electronic device (i.e., situated in front of a display either as a separate part or integrated within the display. Alternatively or additionally, the glass member may form a part of the housing. For example, it may form an outer surface other than in the display area.

The apparatus, systems and methods for improving strength of thin glass are especially suitable for glass covers, or displays (e.g., LCD displays), assembled in small form factor electronic devices such as handheld electronic devices (e.g., mobile phones, media players, personal digital assistants, remote controls, etc.). The glass can be thin in these small form factor embodiments, such as less than 3 mm, or more particularly between 0.5 and 2.5 mm. The apparatus, systems and methods can also be used for glass covers or displays for other devices including, but not limited to including, relatively larger form factor electronic devices (e.g., portable computers, tablet computers, displays, monitors, televisions, etc.). The glass can also be thin in these larger form factor embodiments, such as less than 5 mm, or more particularly between 0.5 and 3 mm.

By forming edges of a glass cover with a predetermined geometry and providing chemical strengthening to the glass cover, stress at the vicinity of the edges of the glass cover can be reduced. As a result, the edges are less susceptible to uncontrolled cracking or breaking when subjected to significant abnormal forces, such as a drop event.

In one embodiment, forming of the edges to correspond to a particular predetermined geometry and providing chemical strengthening can cause compression in the vicinity of the edges of the glass cover to be enhanced (while reducing stress at the vicinity of the edges). The glass cover can thereby be made stronger by imposing the particular predetermined geometry to the edges of the glass cover. In one embodiment, surfaces, e.g., edges, of the glass cover can be chemically strengthened. In one embodiment, the edge geometry is configured to reduce or smooth out sharp transitions, such as corners. In one embodiment, the edge geometry can yield a smoothed corner, where for example a corner between a first surface and a second surface such as for example top/bottom surface and a side surface that is substantially perpendicular can be rendered less sharp. This may for example be accomplished by transitioning one surface to the other with a curve. By way of example, the corner can be rounded. For example, sharp edges, such as corners, can be desharpened or smoothed to create a more continuous transition from one surface to another. For example, an edge between a first surface (e.g., top or bottom surface) and a second surface (e.g., side surface) that might be perpendicular thereto can be desharpened. As another example, transition between a top surface to a side surface or between a bottom surface and a side surface can be desharpened or smoothed.

In one embodiment, a glass cover can extend to the edge of a housing of an electronic device without a protective bezel or other barrier. In one embodiment, the glass cover can include a bezel that surrounds its edges. In either cases, the edges are stronger by creating a specific edge geometry and/or chemical strengthening. The glass cover can be provided over or integrated with a display, such as a Liquid Crystal Display (LCD) display.

Embodiments are discussed below with reference to FIGS. 1-13. However, those skilled in the art will readily appreciate that the detailed description given herein with respect to these figures is for explanatory purposes as the invention extends beyond these limited embodiments.

FIG. 1A is a perspective diagram of glass member 10 in accordance with one embodiment. Glass member 10 is a thin sheet of glass. For example, the thickness of the glass in many applications is less or equal to 3 mm. The length, width or area for glass member 10 is dependent on the application. One application for glass member 10 is as a cover glass for a housing of an electronic device, such as a portable or handheld electronic device. As illustrated in FIG. 1A, glass member 10 can include front surface 12, back surface 14, top surface 16, bottom surface 18, and side surface 20. For enhanced strength, the edges or the sides (including top, bottom, left and right) are formed in accordance with a predetermined geometry. Using chemical strengthening, the predetermined geometry at the edges can increase the strength of glass member 10 at the edges. The surfaces of glass member 10 can also be chemically strengthened. The use of the predetermined geometry can render the edges more receptive to chemical strengthening. Chemically strengthening can, for example, be performed on glass member 10 by placing glass member 10 in a chemical solution with which glass member 10 can interact, such as by ion exchange. As noted below, the predetermined geometry for the edges can provide smooth transitions (e.g., curved, rounded) in place of sharp transitions. In one embodiment, the glass member is a glass structure provided with or for a consumer electronic device. The glass member can be provided on an exterior or interior surface of the consumer electronic device. The glass structure can, in generally, be any part of the consumer electronic device that is made of glass. In one embodiment, the glass structure is at least a portion of a housing (e.g., outer surface) for the consumer electronic device.

Figure 1B:
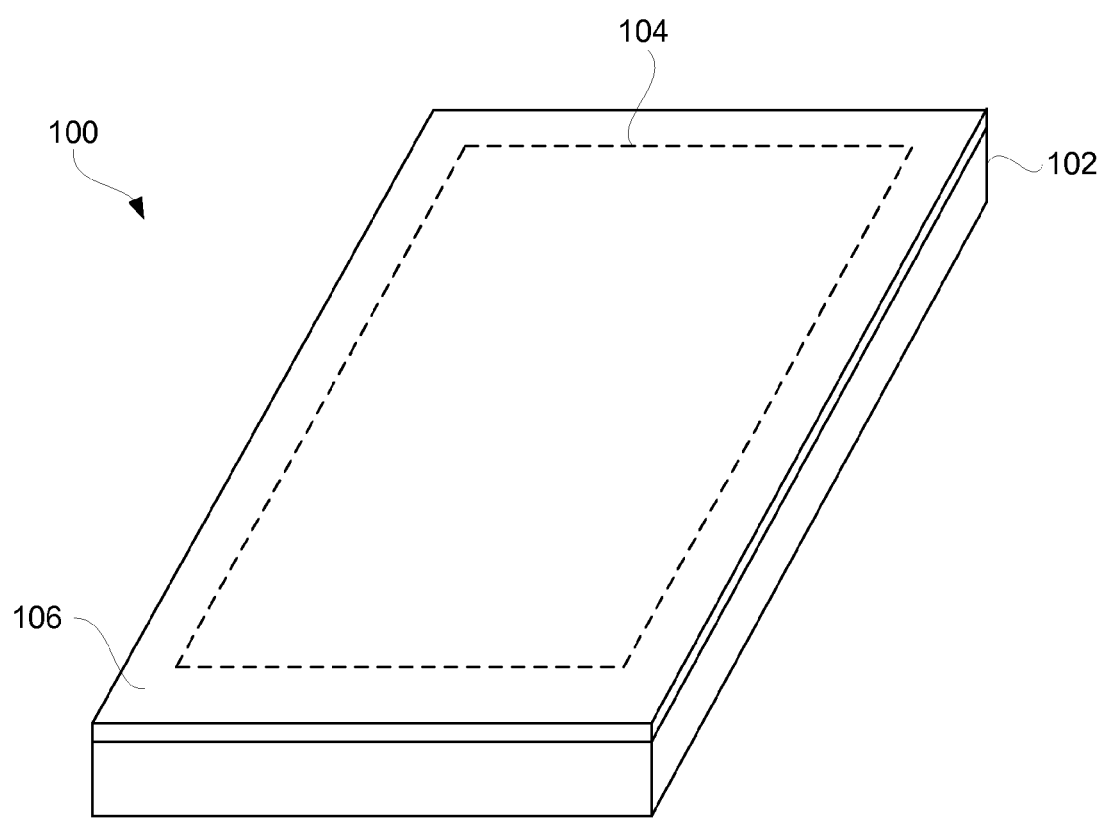
FIG. 1B is a simplified diagram of an electronic device in accordance with one embodiment.

FIG. 1B is a simplified diagram of electronic device 100 in accordance with one embodiment. Electronic device 100 may, for example, be embodied as portable or handheld electronic device having a thin form factor (or low profile). Electronic device 100 can, for example, correspond to a portable media player, a media storage device, a Portable Digital Assistant (PDA), a tablet PC, a computer, a mobile communication device (e.g., a cellular phone, a smart phone), a GPS unit, a remote control device, and the like. The electronic device 100 can be referred to as a consumer electronic device.

Electronic device 100 can include housing 102 that serves as the outer surface for electronic device 100. Electrical components (not shown) are disposed within housing 102. The electrical components can include a controller (or processor), memory, battery, and a display (e.g., LCD display). Display area 104 is disposed within housing 102 of electronic device 100. Electronic device 100 can include a full view or substantially full view display area 104 that consumes a majority if not all of the front surface of electronic device 100. Display area 104 may be embodied in a variety of ways. In one example, display area 104 consists of at least a display such as a flat panel display and more particularly an LCD display. Additionally, electronic device 100 has cover glass 106 provided over display area 104. Cover glass 106 server as an external surface, i.e., top surface, for electronic device 100. Cover glass 106 can be clear or transparent so that display area 104 can be viewed through cover glass 106. Cover glass 106 also resist scratching and therefore provide a substantially scratch-resistance surface for the top surface of housing 102 for electronic device 100.

Display area 104 may alternatively or additionally include a touch sensing device positioned over a display screen. For example, display area 104 may include one or more glass layers having capacitive sensing points distributed thereon. Each of these components can be separate layers or they may be integrated into one or more stacks. In one embodiment, cover glass 106 can act as the outer most layer of display area 104.

Any component of electronic 100 is susceptible to breakage if used in an abusive manner. For example, cover glass 106 can be a weak point of electronic device 100 in terms of strength against bending and damage if dropped. As a result, cover glass 106 can be susceptible to damage when electronic device 100 is stressed as for example in a drop event. By way of example, stress to cover glass 106 can result in damage, such as cracks or breaks. This problem is exacerbated in view of the continuing need to make things smaller and therefore thinner because thinner glass offers less strength.

Further, as shown in FIG. 1B, cover glass 106 can extend across the entire top surface of housing 102. In such a case, the edges of cover glass 106 are aligned, or substantially aligned, with the sides of housing 102. However, in other embodiments, the cover glass 106 need only be provided over a portion of a given surface of housing 102. In any case, given that the thickness of cover glass 106 is rather thin (i.e., less than a few millimeters), cover glass 106 can be cover glass 106 can be strengthened so as to reduce its susceptibility to damage.

First, the glass material for cover glass 106 can be selected from available glass that is stronger. For example, alumino silicate glass is one suitable choice for the glass material for cover glass 106. Other examples of glass materials include, but are not limited to including, soda lime, borosilicate, and the like.

Second, the glass material can be formed into an appropriate size, such as, for example, by singulating and/or machining. As an example, a sheet of the glass material can be cut into a plurality of individual cover glass pieces. The cover glass pieces can, for example, be suitably sized to fit on the top surface of housing 102 for electronic device 100.

In one embodiment, the edges of the cover glass pieces can be configured to correspond to a particular predetermined geometry. By forming (e.g., machining) the edges of the cover glass pieces to correspond to the particular predetermined geometry, the cover glass pieces become stronger and thus less susceptible to damage. Examples of suitable predetermined geometries for the edges (also known as edge geometries) of the cover glass pieces are discussed below. In one embodiment, the forming (e.g., machining) of the edges to correspond to a particular predetermined geometry can cause compressive stress at the edges to be more uniform. In other words, the compressive stress profile can be managed such that compressive minimum does not deviate much from the average compressive stress. Also, to the extent there is a minimum compressive stress, the predetermined geometry can serve to position the compressive minimum subsurface (i.e., slightly inward) from the edges. In one example, the edge geometry can include soft or gradual transitions from one surface to the other, as for example at interface between a first surface that is perpendicular to a second surface. Here, sharp corners or edges can be curved or otherwise smoothed such that they are less sharp. By rounding or smoothing the sharp corners or edges, as provided by the predetermined geometry, the cover glass pieces can become more receptive to more uniform chemical strengthening.

Third, the cover glass pieces can be chemically treated for further strengthening. One suitable chemical treatment is to place the cover glass pieces in a chemical bath containing Alkali metal ions for a period of time (e.g., several hours) at an elevated temperature. The chemical treatment can desirably result in higher compression stresses at the surface of the cover glass pieces. The depth of the compressive layer being formed can vary with the characteristics of the glass used and the specific chemical treatment. For example, the depth of the compressive layer being formed can, in some embodiments, range from a depth of the compressive layer can be about 10 micrometers for soda lime glass to a depth of about 100 micrometers for alumino silicate glass. More generally, the depth of the compressive layer can be from 10-90 micrometers for soda lime glass or alumino silicate glass. However, it should be understood that the depth of the compressive layer can vary depending on specific chemical treatment applied to the glass.

The surface of the cover glass pieces includes the edges of the cover glass pieces. The higher compression stresses may be the result of ion exchange at or near the surface of the cover glass.

Small form factor devices, such as handheld electronic devices, typically include a display region (e.g., display area 104) that includes various layers. The various layers may include at least a display, and may additionally include a sensing arrangement disposed over (or integrated with) the display. In some cases, the layers may be stacked and adjacent one another, and may even be laminated thereby forming a single unit. In other cases, at least some of the layers are spatially separated and not directly adjacent. For example, the sensing arrangement may be disposed above the display such that there is a gap therebetween. By way of example, the display may include a Liquid Crystal Display (LCD) that includes a Liquid Crystal Module (LCM). The LCM generally includes at least an upper glass sheet and a lower glass sheet that at least partially sandwich a liquid crystal layer therebetween. The sensing arrangement may be a touch sensing arrangement such as those used to create a touch screen. For example, a capacitive sensing touch screen can include substantially transparent sensing points or nodes dispersed about a sheet of glass (or plastic). A cover glass can serve as the outer protective barrier for the display region. The cover glass is typically adjacent the display region but can also be integrated with the display region, such as another layer (outer protective layer) therefor.

Figure 2:
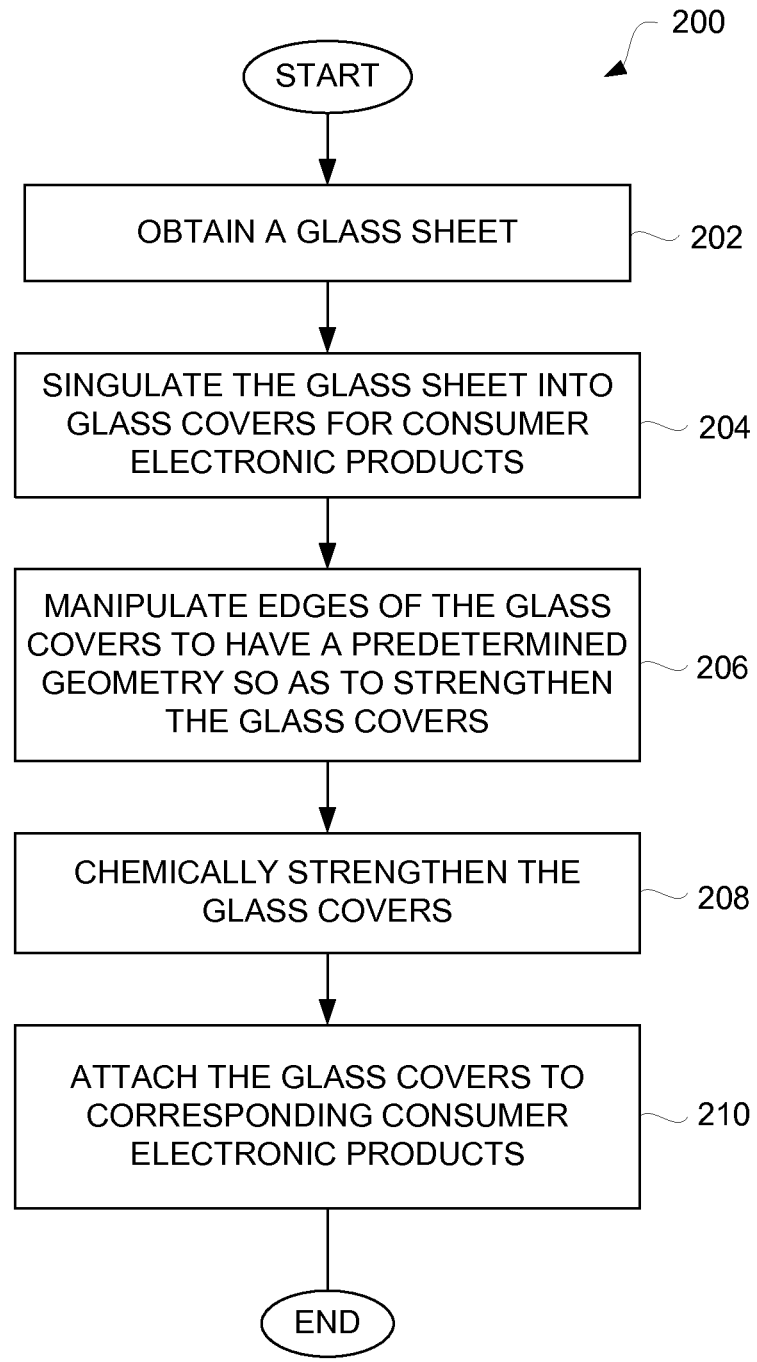
FIG. 2 is a flow diagram of glass cover process according to one embodiment.

FIG. 2 is a flow diagram of glass cover process 200 according to one embodiment. Glass cover process 200 can, for example, be used to form one or more cover glass pieces. The glass cover pieces can, for example, be used for cover glass 106 illustrated in FIG. 1B.

Glass cover process 200 can initially obtain 202 a glass sheet. The glass sheet is, for example, alumino silicate glass. The glass sheet can then be processed to singulate 204 the glass sheet into individualized glass covers. The glass covers are, for example, used on consumer electronic products, such as electronic device 100 illustrated in FIG. 1B. In one embodiment, the glass sheet is cut (e.g., with a blade, scribe & break, water jet or laser) to singulate 204 the glass sheet into the individualized glass covers. In an alternative embodiment, the glass covers can be individually formed without requiring singulation.

Next, the edges of the individual glass covers can be manipulated 206 to have a predetermined geometry so as to strengthen the glass covers. Manipulation 206 of the edges can cause the edges to take the shape of the predetermined geometry. For example, manipulation 206 can machine, grind, cut, etch, scribe, mold, slump or otherwise form the edges of the glass covers into the predetermined geometry. The edges can also be polished.

Additionally, the individual glass covers can be chemically strengthened 208. In one embodiment, the glass cover can be placed in a chemical bath to allow chemical strengthening to occur. In this type of chemical strengthening, an ion exchange process occurs at the surface of the glass covers which serves to increase compressive stress at the surfaces, including the edges.

Thereafter, the glass covers can be attached 210 to corresponding consumer electronic products. The glass covers can form an outer surface of the corresponding consumer electronic product (e.g., top surface of a housing). Once attached 210, the edges of the glass covers can be exposed. Although the edges of the glass covers can be exposed, the edges can be further protected. As one example, the edges of the glass covers can be recessed (e.g., along one or more axes) from the outer sides of a housing for the consumer electronic product. As another example, the edges of the glass covers can be protected by additional material placed around or adjacent the edges of the cover glasses. The glass covers can be attached 210 in a variety of ways, including adhesive, bonding, or mechanical devices (e.g., snaps, screws, etc.). In some embodiments, the glass covers can also have a display module (e.g., LCM) attached. Following attachment 210 of the glass covers to the consumer electronic products, glass cover process 200 can end.

Although manipulation 206 of the edges of the glass covers can manipulate 206 all of the edges of the glass covers, it should be noted that not all of the edges need to be manipulated 206. In other words, depending on the particular embodiment or design, manipulation 206 can be imposed on only one or more of the edges of the glass covers. For a given edge, all or a portion of the edge can be manipulated into a predetermined geometry. Also, different edges can be manipulated 206 differently (i.e., different edges can have different geometries). Also, some edges can a predetermined geometry while other edges can remain sharp. Over a given edge being manipulated 206, the predetermined geometry can also vary, such as with a complex curve (e.g., s-curve).

Singulation 204 of the glass sheet into individual glass covers can be performed in a manner that reduces microcracks and/or stress concentrations at the edges, thereby increasing overall strength. The singulation technique used can vary and can be dependent on the thickness of the glass sheet. In one embodiment, the glass sheet is singulated using a laser scribe process. In another embodiment, the glass sheet is singulated using a mechanical scribing technique, such as where a mechanical cutting wheel may be used.

Figure 3A:
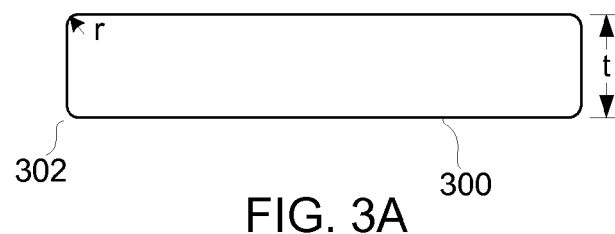
FIGS. 3A-3E are cross-sectional diagrams of glass covers for electronic device housings according to various embodiments.
Figure 3B:
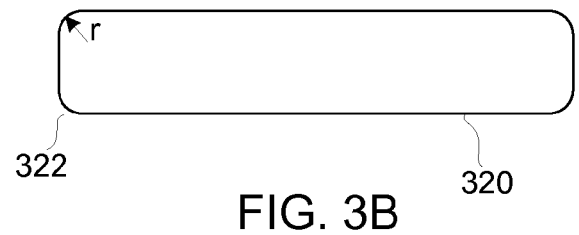

FIGS. 3A-3E are cross-sectional diagrams of glass covers for electronic device housings according to various embodiments. The cross-sectional diagrams illustrate certain predetermined edge geometries that can be used for glass covers to be provided on electronic device housings. It should be appreciated that the edge geometries shown are by way of example, and are not to be construed as being limiting. The width and thickness depicted in FIGS. 3A-3B are not to scale for purposes of illustration.

FIG. 3A illustrates a cross-sectional diagram of glass cover 300 having edge geometry 302. The thickness (t) for the glass cover is about 1.0 millimeter although it should be appreciated that thickness (t) may vary. Edge geometry 302 can have a small edge radius (r) of, for example, about 0.1 millimeters. Here, the edges of the edge geometry 302 are rounded to an edge radius of 10% of the thickness of the cover glass.

FIG. 3B illustrates a cross-sectional diagram of glass cover 320 having edge geometry 322. The thickness (t) for the glass cover is about 1.0 millimeter although it should be appreciated that thickness (t) may vary. Edge geometry 322 can have an edge radius of, for example, about 0.2 millimeters. Here, the edges of the edge geometry 322 are rounded to an edge radius of 20% of the thickness of the cover glass.

Figure 3C:
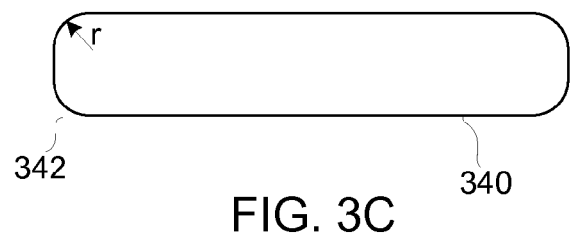

FIG. 3C illustrates a cross-sectional diagram of a glass cover 340 having edge geometry 342. The thickness (t) for the glass cover is about 1.0 millimeter although it should be appreciated that thickness (t) may vary. Edge geometry 342 can have a medium edge radius of, for example, about 0.3 millimeters. Here, the edges of the edge geometry 342 are rounded to an edge radius of 30% of the thickness of the cover glass.

Figure 3D:
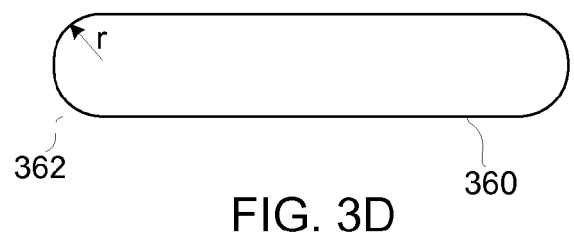

FIG. 3D illustrates a cross-sectional diagram of glass cover 360 having edge geometry 362. The thickness (t) for the glass cover is about 1.0 millimeter although it should be appreciated that thickness (t) may vary. Edge geometry 362 can have a large edge radius (r) of, for example, about 0.4 millimeters. Here, the edges of the edge geometry 362 are rounded to an edge radius of 50% of the thickness of the cover glass.

Figure 3E:
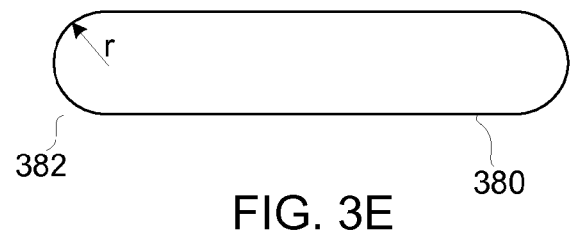

FIG. 3E illustrates a cross-sectional diagram of a glass cover 380 having an edge geometry 382. The thickness (t) for the glass cover is about 1.0 millimeter although it should be appreciated that thickness (t) may vary. The edge geometry 382 can have a full edge radius (r) of, for example, about 0.5 millimeters. Here, the edges of the edge geometry 382 are rounded to an edge radius of 50% of the thickness of the cover glass.

In general, the predetermined edge geometries illustrated in FIGS. 3A-3E serve to round the edges of a glass cover. By eliminating sharp edges on the glass cover, the strength of the glass cover is able to be increased. Specifically, rounding otherwise sharp edges improves strength of the edges, thereby strengthening the edges which would otherwise be weak regions of a glass cover. The edges are able to be strengthened so that compressive stress of the glass cover is generally uniform over its surface, even at the edges. In general, the larger the edge radius, the more uniform the strengthening over the surface of the glass cover, and thus the greater the strength.

Besides the rounding of the edges illustrated in FIGS. 3A-3E, the edges of a glass cover can be machined in ways other than through rounding. As one example, edge geometries can pertain to flattening of the edges. As another example, edge geometries can be complex geometries. One example of a complex geometry is a spline curve. Another example of a complex geometry is an s-curve.

Figure 4A:
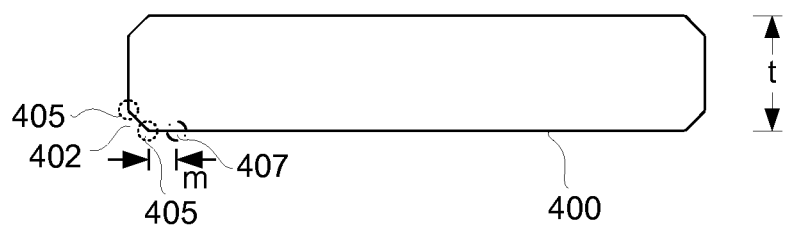
FIG. 4A is a cross-sectional diagram of a glass cover for electronic device housings according to another embodiment.

FIG. 4A is a cross-sectional diagram of a glass cover for an electronic device housings according to an additional embodiment that pertains to a chamfered edge geometry. More particularly, FIG. 4A illustrates a cross-sectional diagram of glass cover 400 having edge geometry 402. The thickness (t) for the glass cover is about 1.0 millimeter. Edge geometry 402 has flattened edges. Edge geometry 402 is effectively a chamfered edge. A chamfer is a beveled edge that substantially connects two sides or surfaces. In one embodiment, a chamfered edge may have a depth of between approximately 0.15 millimeters and approximately 0.25 millimeters. By way of example, edge geometry 402 may include an approximately 0.15 millimeter chamfer or an approximately 0.25 millimeter chamfer. By providing the chamfered edge, substantially minimum compressive stresses may occur approximately at locations 405. One location which corresponds to a substantially minimum Van Mises stress location is indicated at a location 407. In one embodiment, location 407 is substantially centered at approximately ten (10) micrometers from a corner associated with edge geometry 402. In other words, moving the minimum compressive stress inward from the edge (e.g., corner), such as by use of edge geometry 402, can render the edge stronger. If the flattened edges are also rounded, such as on the order illustrated in FIGS. 3A-3E, the flattened edges (e.g., locations 405) can be more uniformly chemically strengthened.

Figure 4B:
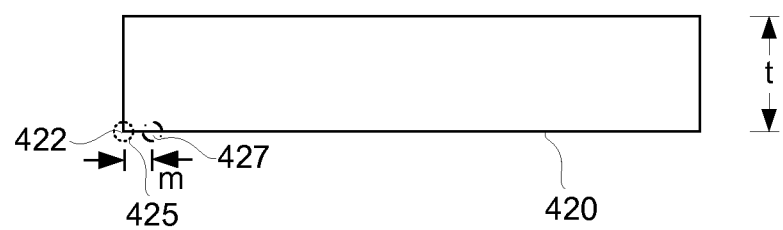
FIG. 4B is a cross-sectional diagram of a glass cover for electronic device housings according to a reference embodiment.

FIG. 4B illustrates a cross-sectional diagram of glass cover 420 having reference edge geometry 422 that includes a straight corner (i.e., sharp corner). While this edge geometry does not yield the strength enhancement of the predetermined edge geometries, such as in FIGS. 3A-3E. The thickness (t) for the glass cover is about 1.0 millimeter although it should be appreciated that thickness (t) may vary. Reference edge geometry 422 is a straight corner, e.g., an approximately 90 degree corner. With reference edge geometry 422, an area of substantially minimum compressive stress occurs at location 425. One location which corresponds to a substantially minimum Van Mises stress location is indicated at location 427. In one embodiment, location 427 is substantially centered at approximately ten micrometers from a corner associated with the reference edge geometry 422. In comparing the location of the substantially minimum Van Mises stress location of FIGS. 4A and 4B, location 407 is further from the edge that the location 427.

Figure 5A:
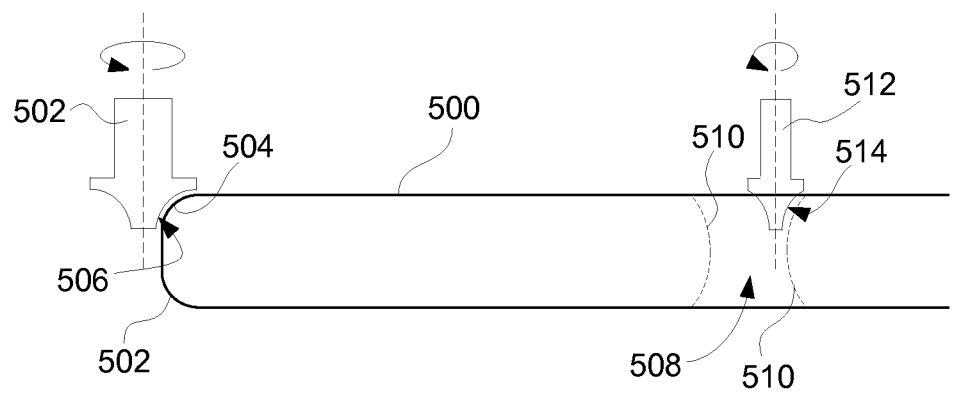
FIG. 5A is a cross-sectional diagram of a glass cover for an electronic device housing being manipulated according to one embodiment.

FIG. 5A is a cross-sectional diagram of a glass cover for an electronic device housing 500 being manipulated according to one embodiment. A machining tool 502 can be controlled so as to move around an outer periphery of the electronic device housing 500 to form outer edges 504 with a predetermined edge geometry. The machining tool 502 includes at least one machining surface 506 that is used to manipulate the outer edges 504. For example, the machining surface 506 can grind or cut the outer edges 504 to the predetermined edge geometry.

In FIG. 5A, the electronic device housing 500 can also include an opening 508 such as for a speaker, microphone, button, etc. The opening 508 can also have rounded surfaces 510 that can be shaped by a machining tool 512. The rounded surfaces 510, like the outer edges 504 with the predetermined edge geometry, can provide improved strength. The machining tool 512 includes at least one machining surface 514 that is used to manipulate the rounded surfaces 510. For example, the machining surface 514 can grind or cut the rounded surfaces 510 to provide the desired rounding. The machining tool 512 can be the same as the machining tool 502 or can be a different machining tool.

Figure 5B:
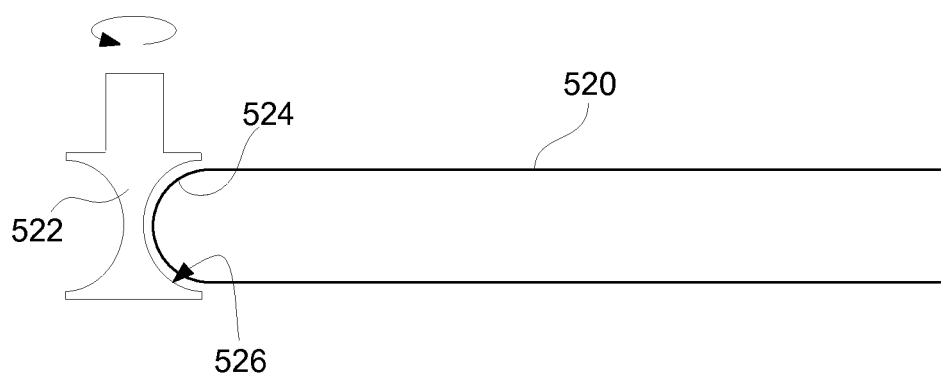
FIG. 5B is a cross-sectional diagram of a glass cover for an electronic device housing being manipulated according to another embodiment.

FIG. 5B is a cross-sectional diagram of a glass cover for an electronic device housing 520 being manipulated according to another embodiment. A machining tool 522 can be controlled so as to move around outer periphery of the electronic device housing 520 to form outer edges 524 with a predetermined edge geometry. The machining tool 522 includes at least one machining surface 526 that is used to manipulate the outer edges 524. The machining surface 526 can grind or cut the outer edges 524 to the predetermined edge geometry.

As previously discussed, glass covers can be used as an outer surface of portions of a housing for electronic devices, e.g., handheld electronic devices. A handheld electronic device may, for example, function as a media player, phone, internet browser, email unit or some combination of two or more of such. A handheld electronic device generally includes a housing and a display area. With reference to FIGS. 5A-5D, different handheld electronic devices having cover glass (or glass windows) may be assembled in accordance with embodiments of the invention. By way of example, the handheld electronic devices may correspond to an iPhone™ or iPod™ manufactured by Apple Inc. of Cupertino, Calif.

Figure 6A:
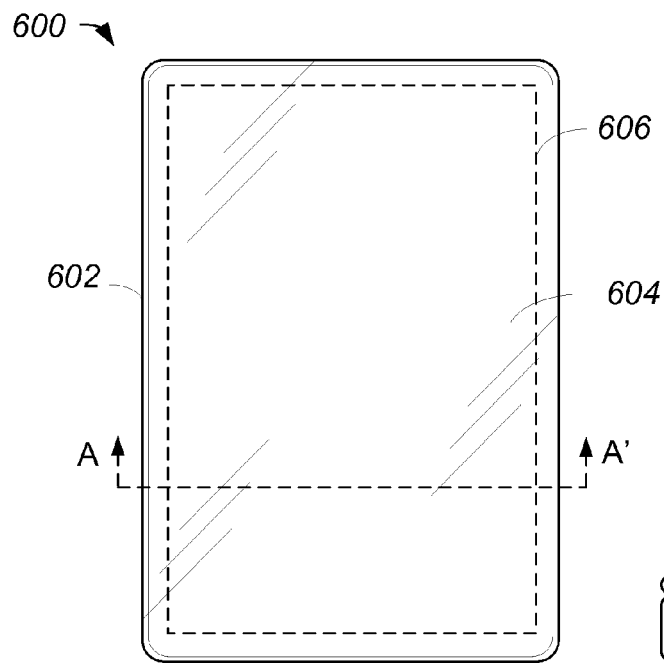
FIGS. 6A and 6B are a diagrammatic representation of an electronic device according to one embodiment.
Figure 6B:
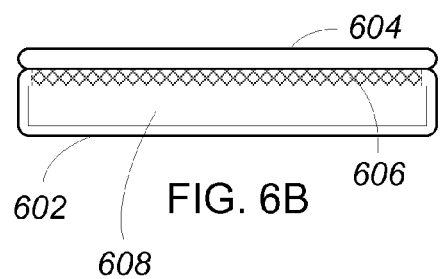

FIGS. 6A and 6B are diagrammatic representations of electronic device 600 according to one embodiment. FIG. 6A illustrates a top view for the electronic device 600, and FIG. 6B illustrates a cross-sectional side view for electronic device 600 with respect to reference line A-A'. Electronic device 600 can include housing 602 that has glass cover window 604 (glass cover) as a top surface. Cover window 604 is primarily transparent so that display assembly 606 is visible through cover window 604. In one embodiment, the cover window 604 can be strengthened using any of the techniques described herein. Display assembly 606 can, for example, be positioned adjacent cover window 604. Housing 602 can also contain internal electrical components besides the display assembly, such as a controller (processor), memory, communications circuitry, etc. Display assembly 606 can, for example, include a LCD module. By way of example, display assembly 606 may include a Liquid Crystal Display (LCD) that includes a Liquid Crystal Module (LCM). In one embodiment, cover window 604 can be integrally formed with the LCM. Housing 602 can also include an opening 608 for containing the internal electrical components to provide electronic device 600 with electronic capabilities. In one embodiment, housing 602 may need not include a bezel for cover window 604. Instead, cover window 604 can extend across the top surface of housing 602 such that the edges of cover window 604 can be aligned (or substantially aligned) with the sides of housing 602. The edges of cover window 604 can remain exposed. Although the edges of cover window 604 can be exposed as shown in FIGS. 6A and 6B, in alternative embodiment, the edges can be further protected. As one example, the edges of cover window 604 can be recessed (horizontally or vertically) from the outer sides of housing 602. As another example, the edges of cover window 604 can be protected by additional material placed around or adjacent the edges of cover window 604.

Cover window 604 may generally be arranged or embodied in a variety of ways. By way of example, cover window 604 may be configured as a protective glass piece that is positioned over an underlying display (e.g., display assembly 606) such as a flat panel display (e.g., LCD) or touch screen display (e.g., LCD and a touch layer). Alternatively, cover window 604 may effectively be integrated with a display, i.e., glass window may be formed as at least a portion of a display. Additionally, cover window 604 may be substantially integrated with a touch sensing device such as a touch layer associated with a touch screen. In some cases, cover window 604 can serve as the outer most layer of the display.

Figure 7A:
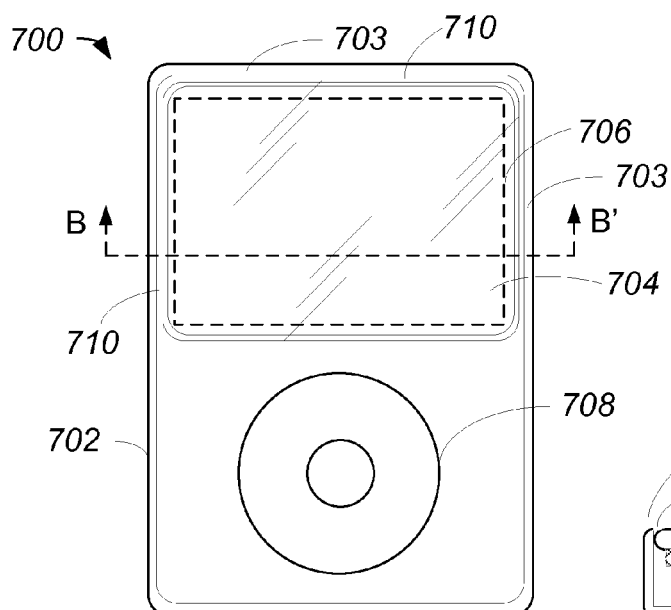
FIGS. 7A and 7B are a diagrammatic representation of an electronic device according to another embodiment.
Figure 7B:
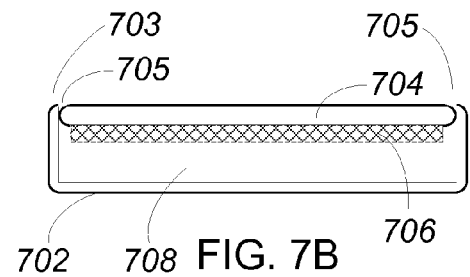

FIGS. 7A and 7B are diagrammatic representations of electronic device 700 according to another embodiment of the invention. FIG. 7A illustrates a top view for electronic device 700, and FIG. 7B illustrates a cross-sectional side view for electronic device 700 with respect to reference line B-B'. Electronic device 700 can include housing 702 that has glass cover window 704 (glass cover) as a top surface. In this embodiment, cover window 704 can be protected by side surfaces 703 of housing 702. Here, cover window 704 does not fully extend across the top surface of housing 702; however, the top surface of side surfaces 703 can be adjacent to and aligned vertically with the outer surface of cover window 704. Since the edges of cover window 704 can be rounded for enhanced strength, there may be gaps 705 that are present between side surfaces 703 and the peripheral edges of cover window 704. Gaps 705 are typically very small given that the thickness of cover window 704 is thin (e.g., less than 3 mm). However, if desired, gaps 705 can be filled by a material. The material can be plastic, rubber, metal, etc. The material can conform in gap 705 to render the entire front surface of electronic device 700 flush, even across gaps 705 proximate the peripheral edges of cover window 704. The material filling gaps 705 can be compliant. The material placed in gaps 705 can implement a gasket. By filling the gaps 705, otherwise probably undesired gaps in the housing 702 can be filled or sealed to prevent contamination (e.g., dirt, water) forming in the gaps 705. Although side surfaces 703 can be integral with housing 702, side surface 703 could alternatively be separate from housing 702 and, for example, operate as a bezel for cover window 704.

Cover window 704 is primarily transparent so that display assembly 706 is visible through cover window 704. Display assembly 706 can, for example, be positioned adjacent cover window 704. Housing 702 can also contain internal electrical components besides the display assembly, such as a controller (processor), memory, communications circuitry, etc. Display assembly 706 can, for example, include a LCD module. By way of example, display assembly 706 may include a Liquid Crystal Display (LCD) that includes a Liquid Crystal Module (LCM). In one embodiment, cover window 704 is integrally formed with the LCM. Housing 702 can also include an opening 708 for containing the internal electrical components to provide electronic device 700 with electronic capabilities.

The front surface of electronic device 700 can also include user interface control 708 (e.g., click wheel control). In this embodiment, cover window 704 does not cover the entire front surface of electronic device 700. Electronic device 700 essentially includes a partial display area that covers a portion of the front surface.

Cover window 704 may generally be arranged or embodied in a variety of ways. By way of example, cover window 704 may be configured as a protective glass piece that is positioned over an underlying display (e.g., display assembly 706) such as a flat panel display (e.g., LCD) or touch screen display (e.g., LCD and a touch layer). Alternatively, cover window 704 may effectively be integrated with a display, i.e., glass window may be formed as at least a portion of a display. Additionally, cover window 704 may be substantially integrated with a touch sensing device such as a touch layer associated with a touch screen. In some cases, cover window 704 can serve as the outer most layer of the display.

As noted above, the electronic device can be a handheld electronic device or a portable electronic device. The invention can serve to enable a glass cover to be not only thin but also adequately strong. Since handheld electronic devices and portable electronic devices are mobile, they are potentially subjected to various different impact events and stresses that stationary devices are not subjected to. As such, the invention is well suited for implementation of glass surfaces for handheld electronic device or a portable electronic device that are designed to be thin.

The strengthened glass, e.g., glass covers or cover windows, is particularly useful for thin glass applications. For example, the thickness of a glass cover being strengthen can be between about 0.5-2.5 mm. In other embodiments, the strengthening is suitable for glass products whose thickness is less than about 2 mm, or even thinner than about 1 mm, or still even thinner than about 0.6 mm.

The techniques for strengthening glass, e.g., glass covers or cover windows, are particularly useful for edges of glass that are rounded by a predetermined edge geometry having a predetermined edge radius (or predetermined curvature) of at least 10% of the thickness applied to the corners of the edges of the glass. In other embodiments, the predetermined edge radius can be between 20% to 50% of the thickness of the glass. A predetermined edge radius of 50% can also be considered a continuous curvature (or fully rounded), one example of which is illustrated in FIG. 3E. Alternatively, the strengthened glass, e.g., glass covers or cover windows, can be characterized such that, following the strengthening, the glass has a strength that is substantially uniform across the surface of the glass, including the edges. For example, in one embodiment, the strength reduction at the edges of the glass is no more than 10% lower than the strength of the glass at other non-edge portions. As another example, in another embodiment, the strength reduction at the edges of the glass is no more than 5% lower than the strength of the glass at other non-edge portions.

In one embodiment, the size of the glass cover depends on the size of the associated electronic device. For example, with handheld electronic devices, the size of the glass cover is often not more than five (5) inches (about 12.7 cm) diagonal. As another example, for portable electronic devices, such as smaller portable computers or tablet computers, the size of the glass cover is often between four (4) (about 10.2 cm) to twelve (12) inches (about 30.5 cm) diagonal. As still another example, for portable electronic devices, such as full size portable computers, displays or monitors, the size of the glass cover is often between ten (10) (about 25.4 cm) to twenty (20) inches (about 50.8 cm) diagonal or even larger.

However, it should be appreciated that in some cases with larger screen sizes, the thickness of the glass layers may need to be greater. The thickness of the glass layers may need to be increased to maintain planarity of the larger glass layers. While the displays can still remain relatively thin, the minimum thickness may increase with increasing screen size. For example, the minimum thickness of the glass cover can correspond to about 0.4 mm for small handheld electronic devices, about 0.6 mm for smaller portable computers or tablet computers, about 1.0 mm or more for full size portable computers, displays or monitors, again depending on the size of the screen. The thickness of the glass cover can, however, depend on the application, structure and/or the size of an electronic device.

As discussed above, glass cover or, more generally, a glass piece may be chemically treated such that surfaces of the glass are effectively strengthened (e.g., strengthened in a more uniform manner). Through such strengthening, glass pieces can be made stronger so that thinner glass pieces can be used with consumer electronic device. Thinner glass with sufficient strength allows for consumer electronic device to become thinner.

Figure 8:
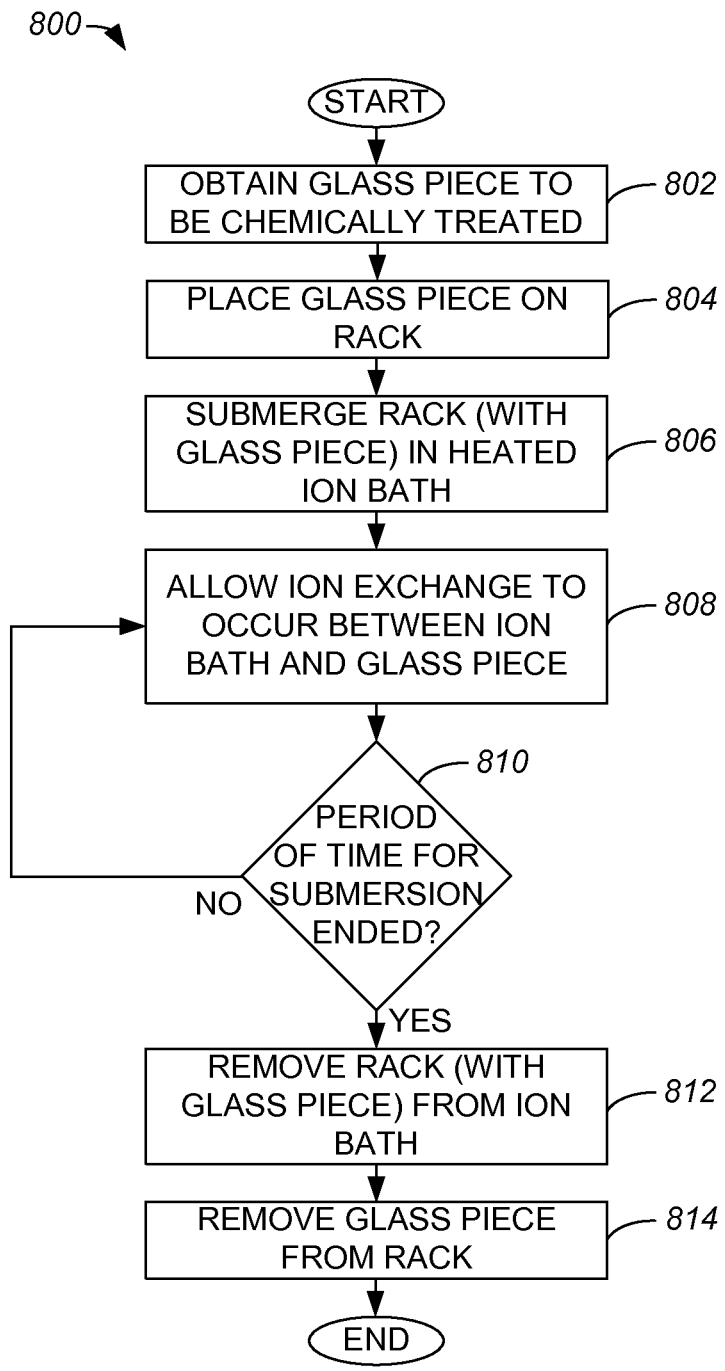
FIG. 8 is flow diagram which illustrates a method of chemically strengthening glass, e.g., a glass cover, according to one embodiment.

FIG. 8 illustrates a process 800 of chemically treating surfaces of a glass piece in accordance with one embodiment. The process 800 of chemically treating surfaces, e.g., edges, of a glass piece can begin at step 802 in which the glass piece is obtained. The glass piece may be obtained, in one embodiment, after a glass sheet is singulated into glass pieces, e.g., glass covers, and the edges of the glass pieces are manipulated to have a predetermined geometry. It should be appreciated, however, that a glass piece that is to be chemically treated may be obtained from any suitable source.

In step 804, the glass piece can be placed on a rack. The rack is typically configured to support the glass piece, as well as other glass pieces, during chemical treatment. Once the glass piece is placed on the rack, the rack can be submerged in a heated ion bath in step 806. The heated ion bath may generally be a bath which includes a concentration of ions (e.g., Alkali metal ions, such as Lithium, Cesium or Potassium). It should be appreciated that the concentration of ions in the bath may vary, as varying the concentration of ions allows compression stresses on surfaces of the glass to be controlled. The heated ion bath may be heated to any suitable temperature to facilitate ion exchange.

After the rack is submerged in the heated ion bath, an ion exchange is allowed to occur in step 808 between the ion bath and the glass piece held on the rack. A diffusion exchange occurs between the glass piece, which generally includes $Na^+$ ions, and the ion bath. During the diffusion exchange, Alkali metal ions, which are larger than $Na^+$ ions, effectively replace the $Na^+$ ions in the glass piece. In general, the $Na^+$ ions near surface areas of the glass piece may be replaced by the Alkali ions, while $Na^+$ ions are essentially not replaced by Alkali ions in portions of the glass which are not surface areas. As a result of the Alkali ions replacing $Na^+$ ions in the glass piece, a compressive layer is effectively generated near the surface of the glass piece. The $Na^+$ ions which have been displaced from the glass piece by the Alkali metal ions become a part of the ion solution.

A determination can be made in step 810 as to whether a period of time for submerging the rack in the heated ion bath has ended. It should be appreciated that the amount of time that a rack is to be submerged may vary widely depending on implementation. Typically, the longer a rack is submerged, i.e., the higher the exchange time for Alkali metal ions and $Na^+$ ions, the deeper the depth of the chemically strengthened layer. For example, with thickness of the glass sheet being on the order of 1 mm, the chemical processing (i.e., ion exchange) provided in the ion bath can be provide into the surfaces of the glass pieces 10 micrometers or more. For example, if the glass pieces are formed from soda lime glass, the depth of the compression layer due to the ion exchange can be about 10 microns. As another example, if the glass pieces are formed from alumino silicate glass, the depth of the compression layer due to the ion exchange can range from about 50 microns to 100 microns.

If the determination in step 810 is that the period of time for submerging the rack in the heated ion bath has not ended, then process 800 flow can return to step 817 in which the chemical reaction is allowed to continue to occur between the ion bath and the glass piece. Alternatively, if it is determined that the period of time for submersion has ended, then the rack can be removed from the ion bath in step 812. Upon removing the rack from the ion bath, the glass piece may be removed from the rack in step 814, and the process 800 of chemically treating surfaces of a glass piece can be completed. However, if desired, the glass piece can be polished. Polishing can, for example, remove any haze or residue on the glass piece following the chemical treatment.

Figure 9A:
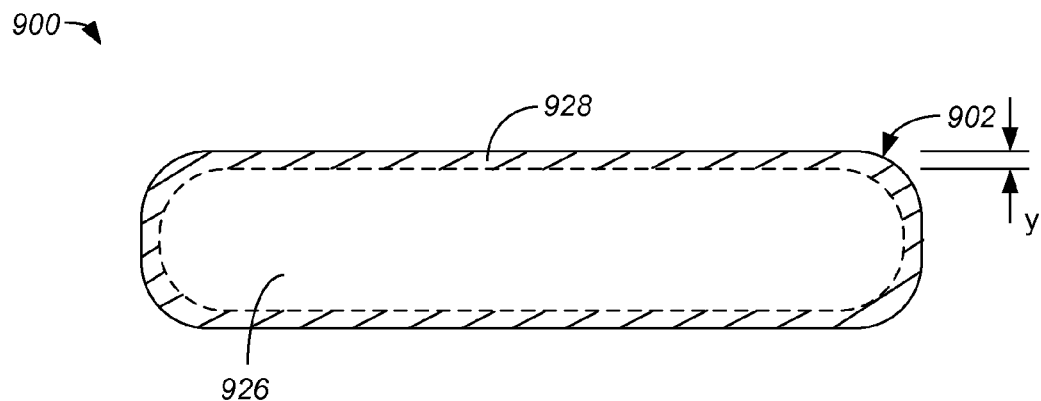
FIG. 9A is a cross-sectional diagram of a glass cover which has been chemically treated according to one embodiment.
Figure 9B:
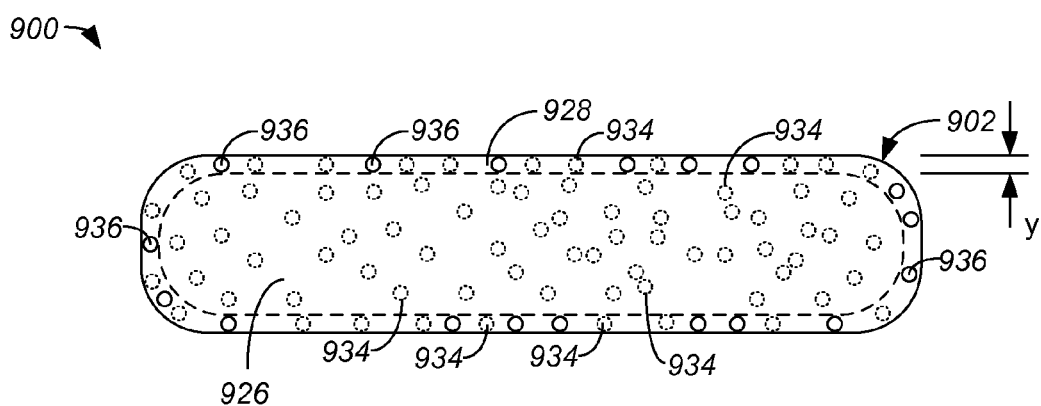
FIG. 9B is a cross-sectional diagram of a glass cover which has been chemically treated, as shown to include a chemically treated portion in which potassium ions have been implanted according to one embodiment.

A glass cover which has undergone a chemical strengthening process generally includes a chemically strengthened layer, as previously mentioned. FIG. 9A is a cross-sectional diagram of a glass cover which has been chemically treated such that a chemically strengthened layer is created according to one embodiment. A glass cover 900 includes a chemically strengthened layer 928 and a non-chemically strengthened portion 926. Although the glass cover 900 is, in one embodiment, subjected to chemical strengthening as a whole, the outer surfaces receive the strengthening. The effect of the strengthening is that the non-chemically strengthened portion 926 is in tension, while the chemically strengthened layer 928 is in compression. While glass cover 900 is shown as having a rounded edge geometry 902, it should be appreciated that glass cover 900 may generally have any edge geometry such as those selected to increase the strength of the edges of glass cover 900. Rounded edge geometry 902 is depicted by way of example, and not for purposes of limitation.

Chemically strengthened layer 928 has a thickness (y) which may vary depending upon the requirements of a particular system in which glass cover 900 is to be utilized. Non-chemically strengthened portion 926 generally includes $Na^+$ ions 934 but no Alkali metal ions 936. A chemical strengthening process causes chemically strengthened layer 928 to be formed such that chemically strengthened layer 928 includes both $Na^+$ ions 934 and Alkali metal ions 936. In one embodiment, chemically strengthened layer 928 may be such that an outer portion of chemically strengthened layer 928 includes substantially more $Na^+$ ions 934 than an underlying portion of chemically strengthened layer 928 which includes both $Na^+$ ions 934 and Alkali metal ions 936

Figure 10:
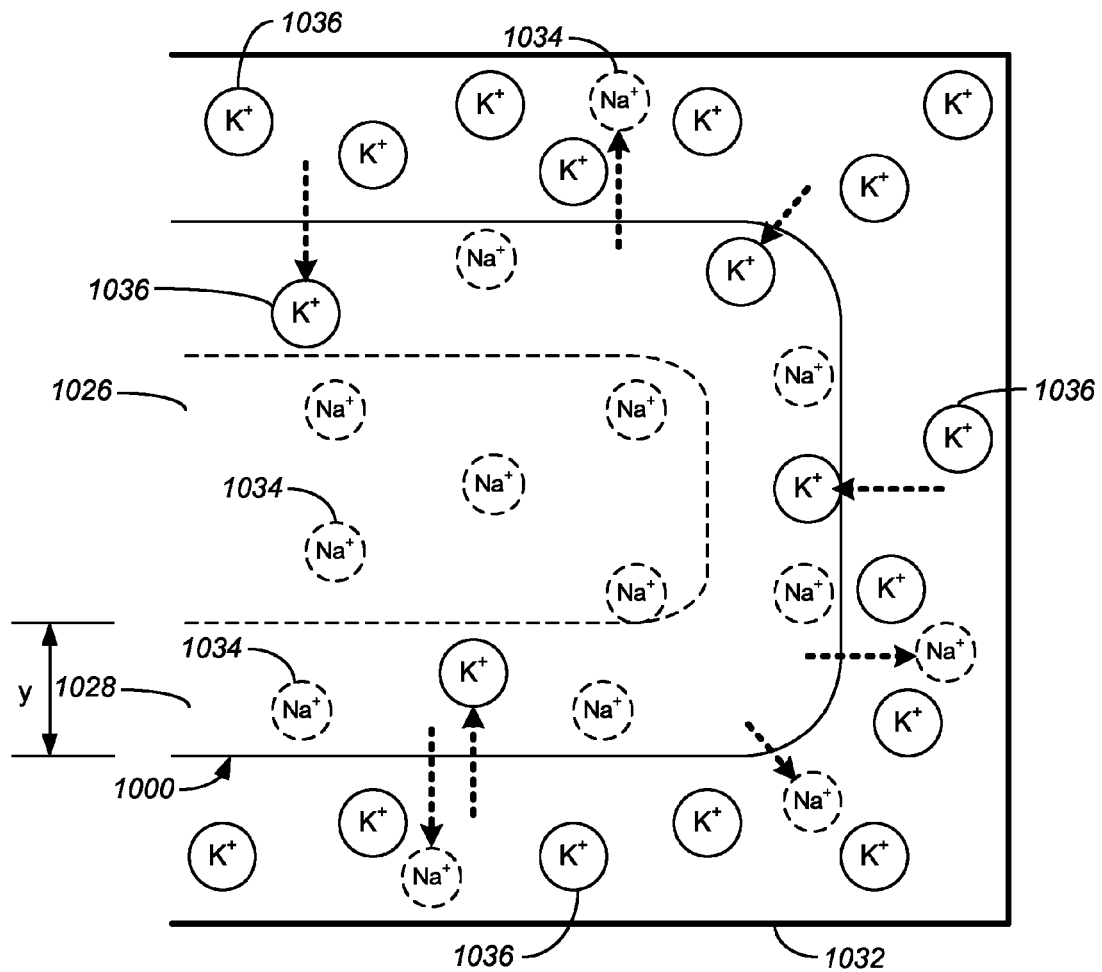
FIG. 10 is a diagrammatic representation of a chemical treatment process that involves submerging a glass cover in an ion bath according to one embodiment.

FIG. 10 is a diagrammatic representation of a chemical treatment process that involves submerging a glass cover in an ion bath according to one embodiment. When glass cover 1000, which is partially shown in cross-section, is submerged or soaked in a heated ion bath 1032, diffusion occurs. As shown, Alkali metal ions 1034 which are present in glass cover 1000 diffuse into ion bath 1032 while Alkali metal ions 1036 (e.g., potassium (K)) in ion bath 1032 diffuse into glass cover 1000, such that a chemically strengthened layer 1028 is formed. In other words, Alkali metal ions 1036 from ion bath 1032 can be exchanged with $Na^+$ ions 1034 to form chemically strengthened layer 1028. Alkali metal ions 1036 typically would not diffuse into a center portion 1026 of glass cover 1000. By controlling the duration (i.e., time) of a chemical strengthening treatment, temperature and/or the concentration of Alkali metal ions 1036 in ion bath 1032, the thickness (y) of chemically strengthened layer 1028 may be substantially controlled.

The concentration of Alkali metal ions in an ion bath may be varied while a glass cover is soaking in the ion bath. In other words, the concentration of Alkali metal ions in a ion bath may be maintained substantially constant, may be increased, and/or may be decreased while a glass cover is submerged in the ion bath without departing from the spirit or the scope of the present invention. For example, as Alkali metal ions displace $Na^+$ ions in the glass, the $Na^+$ ions become part of the ion bath. Hence, the concentration of Alkali metal ions in the ion bath may change unless additional Alkali metal ions are added into the ion bath.

Figure 11:
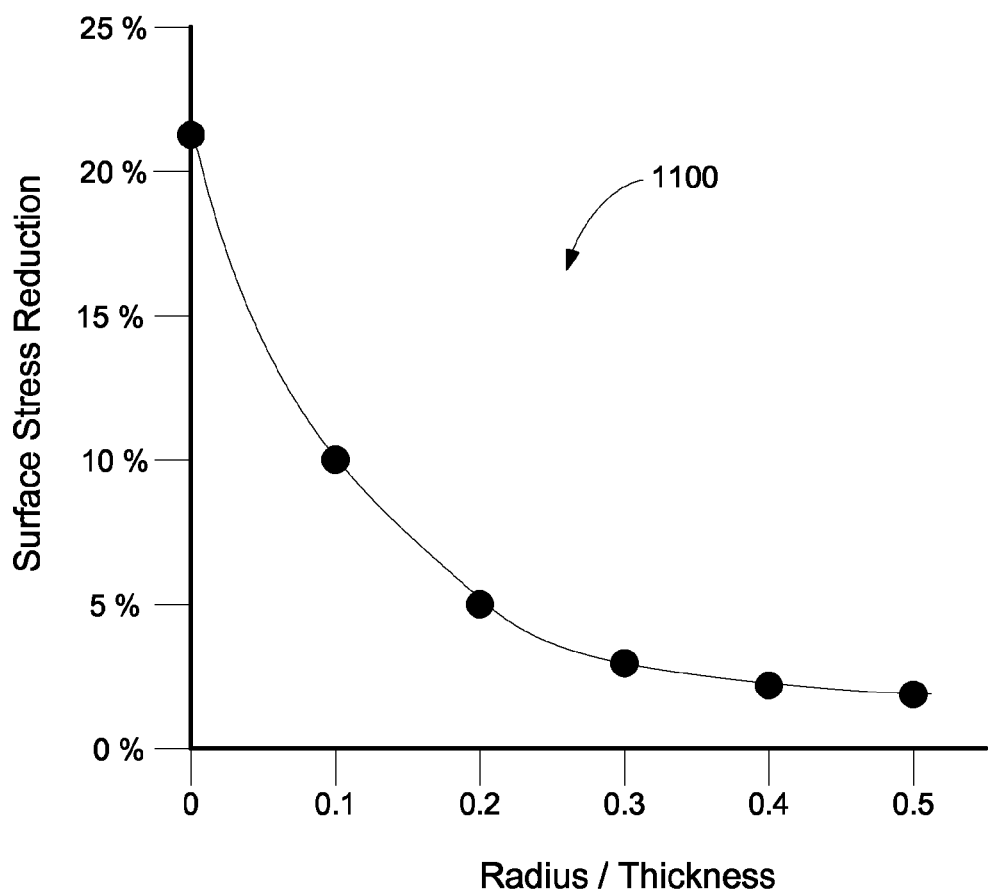
FIG. 11 is an illustration of an exemplary graphical plot of stress reduction at surface of glass according to one embodiment.

FIG. 11 is an illustration of an exemplary graphical plot 1100 of stress reduction at surface of glass according to one embodiment. Here, the glass has edges of a certain geometry and the glass is chemically treated to improve its strength (i.e., chemically strengthened). The graphical plot 1100 references surface stress reduction on a vertical axis and radius/thickness (R/T) on a horizontal axis. In this example, the depth of layer (DOL) for the chemical strengthening is 55 micrometers on a thickness of about 1 mm for the glass. The graphical plot 1100 represents empirical data for compressive stress reduction for a plurality of different edge radii. The larger the edge radii the stronger the glass is at the edges. In other words, the sharper the edges are, the greater the reduction of compressive stress at the edges. That is, chemical strengthening is significantly less effective at edges that are sharp. Hence, by rounding the edges, the chemically strengthening becomes consistently more effective across the surface of the glass, including the edges.

Compressive stress at the edges of glass member desirable since it makes the glass member stronger. FIGS. 12A-12D illustrate exemplary diagrams of compressive stress profiles for glass members proximate to an edge. These diagrams indicate that different edge profiles (also illustrated in FIGS. 12A-12D) can be used to alter compressive stress at edge regions.

Figure 12A:
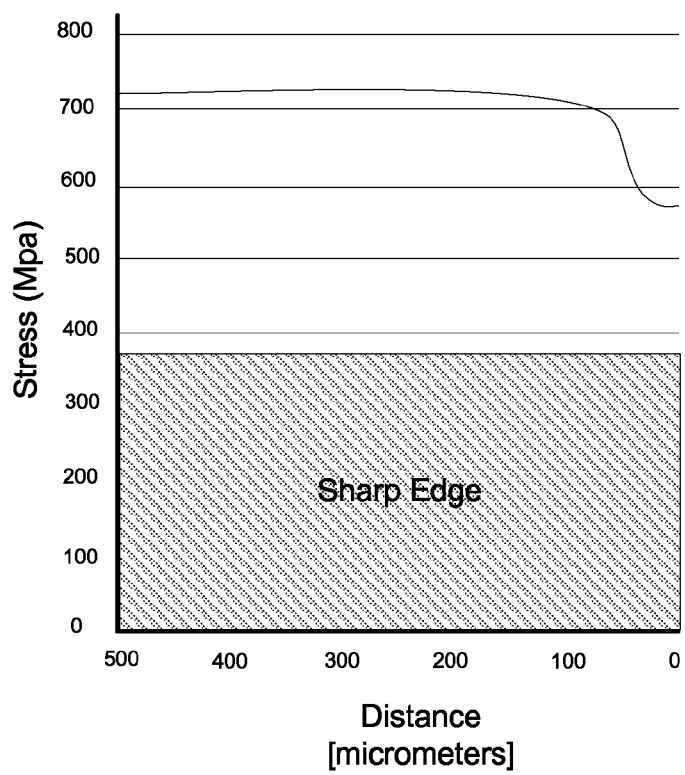
FIGS. 12A-12D illustrate exemplary diagrams of compressive stress profiles for glass members proximate to at an edge.

FIG. 12A is a graphical representation of compressive stress verses distance for a sharp edge profile (e.g., sharp or square edge) according to one embodiment. The compressive stress depicted is for a top surface of a glass member at a corner. The distance depicted in FIG. 12A is the distance inward from the corner. The compressive stress is at a minimum at the corner of the glass member. The compressive stress reduction at the corner is about 22%.

Figure 12B:
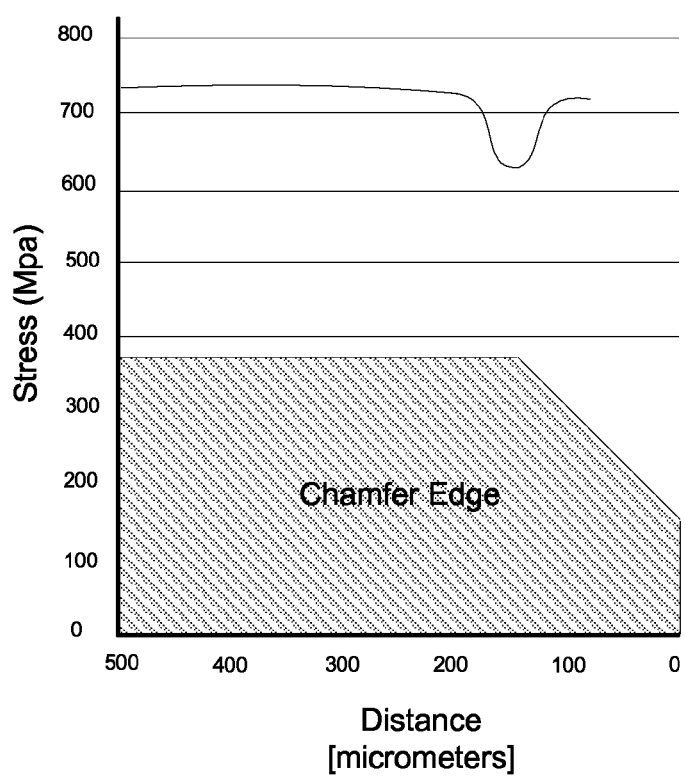

FIG. 12B is a graphical representation of compressive stress verses distance for a chamfered edge profile (e.g., chamfered edge) according to one embodiment. The compressive stress depicted is for a top surface of a glass member at a corner that has been chamfered inward 0.15 mm from the corner. The distance depicted in FIG. 12B is the distance inward from the side. The compressive stress is at a minimum at the corners of the chamfer. The compressive stress reduction at the corners of the chamfer is about 16%, which is about a distance of 15 mm inward from the side.

Figure 12C:
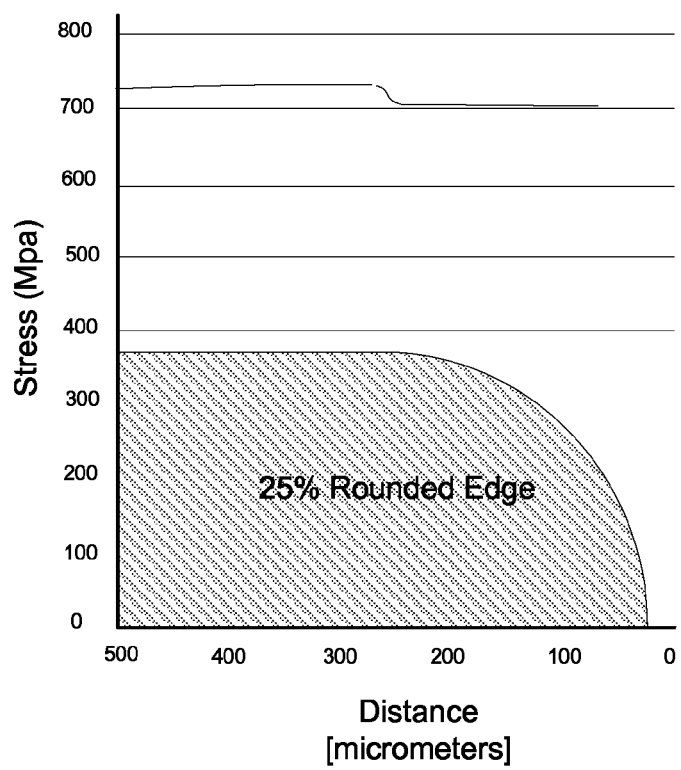

FIG. 12C is a graphical representation of compressive stress verses distance for a rounded edge profile (e.g., rounded edge) according to one embodiment. The compressive stress depicted is for a top surface of a glass member at a corner that has been rounded with an edge radius (r) that is about 25% of the thickness (t) of the glass member. The distance depicted in FIG. 12C is the distance inward from the side. The compressive stress is at a minimum inward from the corner at the transition from the rounded corner and the corresponding side. The compressive stress reduction at the transition is about 4%.

Figure 12D:
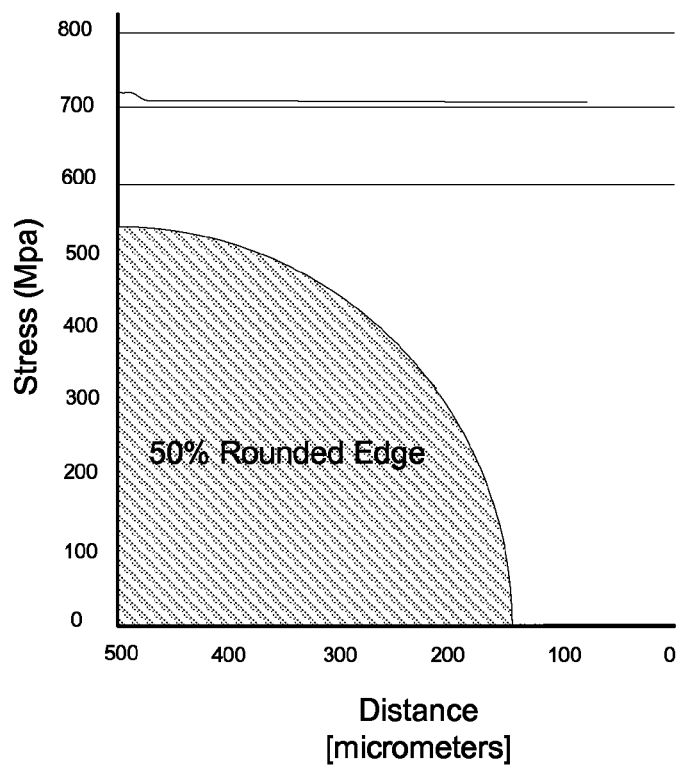

FIG. 12D is a graphical representation of compressive stress verses distance for a rounded edge profile (e.g., rounded edge) according to one embodiment. The compressive stress depicted is for a top surface of a glass member at a corner that has been rounded with an edge radius (r) that is about 50% of the thickness (t) of the glass member. The distance depicted in FIG. 12D is the distance inward from the side. The compressive stress is at a minimum inward from the corner at the transition from the rounded corner and the corresponding side. The compressive stress reduction at the transition is about 2%.

The amount of compressive stress reduction amounts for the rounded edges illustrated in FIGS. 12C and 12D are significantly lowered than for the square edge in FIG. 12A or the chamfered edge in FIG. 12B. However, the chamfered edge in FIG. 12B is an improvement over the square edge in FIG. 12A. In addition, the compressive strength at the rounded edges (FIGS. 12C and 12D) is higher than the compressive stress at the square (FIGS. 12A) or chamfered edges (FIG. 12B). Thus, by using rounded edges on a glass member, the compressive stress reduction at the edges is significantly reduced which yields an overall improvement in strength of the glass member. It should also be noted that with rounded edges, the compressive stress profile for a surface of a glass member is significantly more uniform across the surface of the glass member (see FIGS. 12C and 12D).

Figure 13:
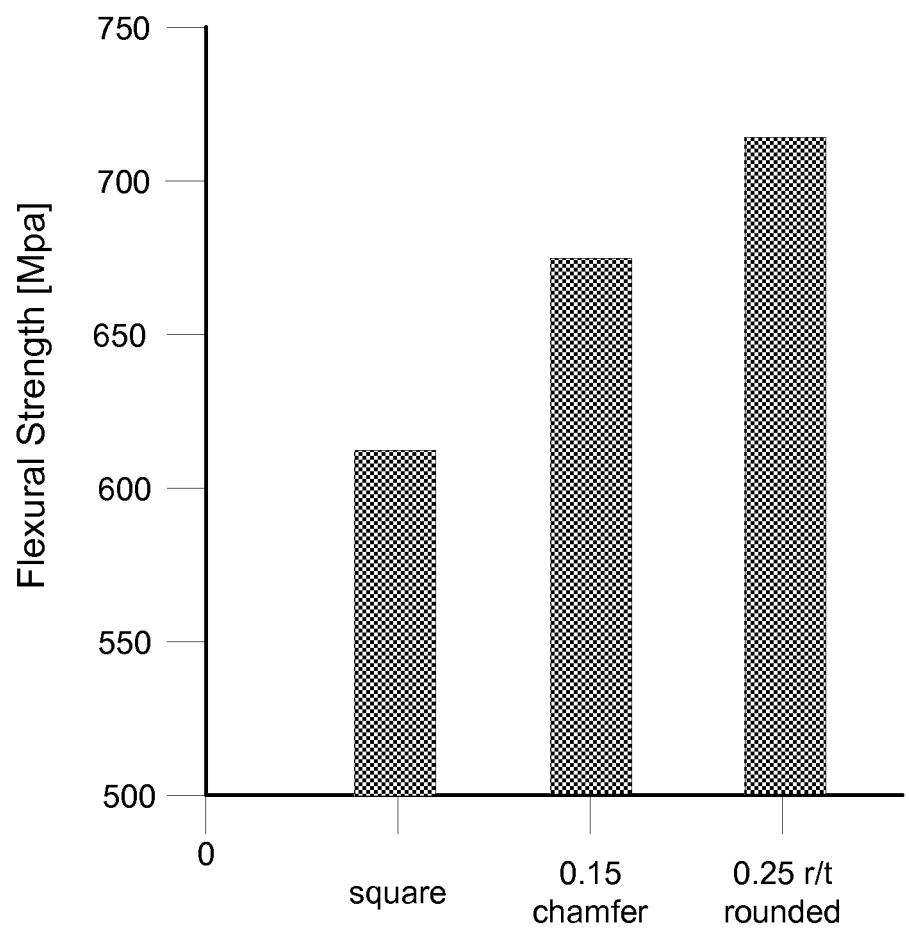
FIG. 13 illustrates an exemplary diagram of flexural strength for glass members having different edge profiles.

Strength (or overall strength) of a glass member can be a flexural strength that can be measured. For example, a four-point bending test can be performed in accordance with ASTM Standard C158-02: Standard Test Methods for Strength of Glass by Flexure. FIG. 13 illustrates an exemplary diagram of flexural strength for glass members having different edge profiles. These edge profiles are the same as the exemplary profiles provided in FIGS. 12A-12C. This diagram indicates that different edge profiles also affect flexure strength in a same manner as compressive stress. Namely, following chemical strengthening, the rounded edges (e.g., FIG. 12C) have greater flexure strength than square (FIGS. 12A) or chamfered edges (FIG. 12B), assuming similar flaw size distribution.

It should also be noted that different edge profiles can yield different flaws at different depths from the edge when being formed. Most flaws appear at transitions, such as between curved radius and a straight surface. The edge profiles that are formed or processed to have a cleaner edge finish (or less surface roughness), e.g., with polishing, can yield smaller flaws.

The techniques described herein can make edges of glass substantially stronger, which can be of particular importance as the glass gets thinner. The predetermined geometry with the rounded edges can, for example, yield edges of glass substantially stronger. With the predetermined geometry at the edges having been provided with significant edge radius (e.g., at least 20% of its thickness), the chemical strengthening that is provided can be more uniform such that the edges are able to be strengthened as other surfaces of the glass. As an example, with use of the predetermined geometry having the rounded edges shown in FIG. 3E the strengthening provided herein can, for example, yield edges of glass that are substantially stronger. For example, the strength improvement for glass having the predetermined geometry at the edges provided with full rounding (e.g., FIG. 3E) can be on the order of 20% stronger than edges having significantly no rounding, that is, sharp edges (e.g., FIG. 4B).

The techniques describe herein may be applied to glass surfaces used by any of a variety of electronic devices including but not limited handheld electronic devices, portable electronic devices and substantially stationary electronic devices. Examples of these include any known consumer electronic device that includes a display. By way of example, and not by way of limitation, the electronic device may correspond to media players, mobile phones (e.g., cellular phones), PDAs, remote controls, notebooks, tablet PCs, monitors, all in one computers and the like.

This also references: (i) U.S. Provisional Patent Application No. 61/247,493, filed Sep. 30, 2009 and entitled "Techniques for Strengthening Glass Covers for Portable Electronic Devices", which hereby incorporated herein by reference in its entirety; (ii) U.S. patent application Ser. No. 12/193,001, filed Aug. 16, 2008, entitled "METHODS AND SYSTEMS FOR STRENGTHENING LCD MODULES", which is hereby incorporated by reference herein; (iii) U.S. patent application Ser. No. 12/172,073, filed Jul. 11, 2008, entitled "METHODS AND SYSTEMS FOR INTEGRALLY TRAPPING A GLASS INSERT IN A METAL BEZEL", which is hereby incorporated by reference herein; (iv) U.S. Provisional Patent Application No. 61/247,493, filed Sep. 30, 2010 and entitled "Techniques for Strengthening Glass Covers for Portable Electronic Devices", which is herein incorporated by reference.

The various aspects, features, embodiments or implementations of the invention described above can be used alone or in various combinations.

Although only a few embodiments of the present invention have been described, it should be understood that the present invention may be embodied in many other specific forms without departing from the spirit or the scope of the present invention. By way of example, the steps associated with the methods of the present invention may vary widely. Steps may be added, removed, altered, combined, and reordered without departing from the spirit of the scope of the invention. Similarly, while operations are depicted in the drawings in a particular order, this should not be understood as requiring that such operations be performed in the particular order shown or in sequential order, or that all illustrated operations be performed, to achieve desirable results.

While this specification contains many specifics, these should not be construed as limitations on the scope of the disclosure or of what may be claimed, but rather as descriptions of features specific to particular embodiment of the disclosure. Certain features that are described in the context of separate embodiments can also be implemented in combination. Conversely, various features that are described in the context of a single embodiment can also be implemented in multiple embodiments separately or in any suitable subcombination. Moreover, although features may be described above as acting in certain combinations, one or more features from a claimed combination can in some cases be excised from the combination, and the claimed combination may be directed to a subcombination or variation of a subcombination.

While this invention has been described in terms of several embodiments, there are alterations, permutations, and equivalents, which fall within the scope of this invention. It should also be noted that there are many alternative ways of implementing the methods and apparatuses of the present invention. It is therefore intended that the following appended claims be interpreted as including all such alterations, permutations, and equivalents as fall within the true spirit and scope of the present invention.

What is claimed is:

1. A consumer electronic product, comprising:
   a housing having a front surface, a back surface and side surfaces;
   electrical components provided at least partially internal to the housing, the electrical components including at least a controller, a memory, and a display, the display being provided at or adjacent the front surface of the housing; and
   a cover glass provided at or over the front surface of the housing such that it is provided over the display, the cover glass comprising:
      a first planar surface;
      a second planar surface opposite the first planar surface; and
      an edge surface extending between the first planar surface and the second planar surface and defining an edge geometry including a rounded transition to each of the first planar surface and the second planar surface,
   wherein the cover glass is chemically strengthened by ion exchange so that a compressive stress along the entire edge surface is no more than 10% lower than a compressive stress at each of the first planar surface and the second planar surface.

2. A consumer electronic product as recited in claim 1, wherein the cover glass has a thickness and the rounded transition has a radius of at least 20% of the thickness.

3. A consumer electronic product as recited in claim 1, wherein the rounded transition has a radius of at least 0.1 mm.

4. A consumer electronic product as recited in claim 1, wherein the rounded transition has a radius of at least 0.2 mm.

5. A consumer electronic product as recited in claim 1, wherein the consumer electronic product is a mobile phone, portable media player, notebook computer or tablet computer.

6. A consumer electronic product as recited in claim 1,
   wherein the consumer electronic product is a handheld electronic device, and
   wherein the consumer electronic product does not include a border or bezel for the cover glass at the edge surface of the cover glass.

7. A consumer electronic product as recited in claim 1, wherein the compressive stress along the entire edge surface includes a compressive layer having a depth of at least 10 microns.

8. A consumer electronic product as recited in claim 1, wherein the cover glass extends completely across the front surface of the housing.

9. A consumer electronic product as recited in claim 1, wherein the consumer electronic product does not include a border or bezel for the cover glass at the edge portion.

10. A consumer electronic product as recited in claim 1, wherein the cover glass is alumino-silicate glass.

11. A consumer electronic product as recited in claim 1, wherein the display is a touch-sensitive display.

12. A consumer electronic product as recited in claim 1, wherein the consumer electronic product is a mobile phone, portable media player, notebook computer or tablet computer.

13. A consumer electronic product as recited in claim 1, wherein the display is a liquid crystal display (LCD).

14. A consumer electronic product as recited in claim 1, wherein the cover glass extends across the front surface of the housing from one of the side surfaces to another of the side surfaces such that the cover glass is provided over the side surfaces.

15. A consumer electronic product as recited in claim 1, wherein, the cover glass has a strength that is substantially uniform across the surfaces of the cover glass, including along the entire edge surface.

16. A consumer electronic product, comprising:
   a housing;
   a display provided at least partially internal to the housing; and
   a cover glass positioned over the display, the cover glass comprising:
      a first planar surface;
      a second planar surface opposite the first planar surface; and
      an edge surface extending between the first planar surface and the second planar surface and defining an edge geometry including a rounded transition to each of the first planar surface and the second planar surface,
      wherein the cover glass is chemically strengthened by ion exchange so that a compressive stress along the entire edge surface is no more than 10% lower than a compressive stress at each of the first planar surface and the second planar surface.

17. The consumer electronic product as recited in claim 16, wherein the cover glass has a thickness and the edge geometry has a radius of 20% to 50% of the thickness at the rounded transition.

18. The consumer electronic product as recited in claim 16, wherein the compressive stress along the entire edge surface includes a compressive layer having a depth of at least 10 microns.

19. The consumer electronic product as recited in claim 16, wherein the compressive stress along the entire edge surface is no more than 5% lower than the compressive stress at each of the first planar surface and the second planar surface.

20. A consumer electronic product as recited in claim 1, wherein the cover glass forms an entire front exterior surface of the consumer electronic product.

21. A cover glass member suitable for attachment to a housing for a handheld electronic device, the cover glass member being produced and strengthened by a process of:
   forming a plurality of cover glass members, each of the cover glass members being suitably sized to be provided on an exposed surface of the handheld electronic device, each of the cover glass members including a first planar surface, a second planar surface opposite the first planar surface, and an edge surface extending between the first planar surface and the second planar surface;
   manipulating each of the cover glass members so that the edge surface of each cover glass member defines an edge geometry including a rounded transition to each of the first planar surface and the second planar surface and
   chemically strengthening each of the cover glass members by ion exchange so that a compressive stress along the entire edge surface is no more than 10% lower than a compressive stress at each of the first planar surface and the second planar surface.

22. A cover glass member as recited in claim 21, wherein a thickness of the cover glass members is less or equal to 1 mm.

23. A cover glass member as recited in claim 21, wherein chemically strengthening each of the cover glass members includes replacing at least a plurality of first type ions in each of the cover glass members with a plurality of second type ions.

* * * * *